United States Patent [19]
Doshi et al.

[11] Patent Number: 6,041,051
[45] Date of Patent: Mar. 21, 2000

[54] METHOD AND APPARATUS ENABLING MULTIPLE ACCESS FOR MULTIPLE SERVICES AND MULTIPLE TRANSMISSION MODES OVER A BROADBAND COMMUNICATION NETWORK UTILIZING AN ADAPTIVE DIGITAL ACCESS PROTOCOL

[75] Inventors: Bharat Tarachand Doshi, Holmdel; Subrahmanyam Dravida, Freehold; George John Kustka, Marlboro; Peter D. Magill, Freehold, all of N.J.; Curtis A. Siller, Andover, Mass.; Kotikalapudi Sriram, Marlboro, N.J.

[73] Assignee: Lucent Technologies, Inc., Murray Hill, N.J.

[21] Appl. No.: 08/832,255

[22] Filed: Apr. 3, 1997

Related U.S. Application Data

[60] Provisional application No. 60/019,776, Jun. 14, 1996.

[51] Int. Cl.[7] .................................................. H04L 12/66
[52] U.S. Cl. ........................................... 370/352; 370/474
[58] Field of Search ..................................... 370/352, 353, 370/355, 470, 471, 474, 476, 442, 458, 465, 598, 395

[56] References Cited

U.S. PATENT DOCUMENTS

| | | | |
|---|---|---|---|
| 5,012,469 | 4/1991 | Sardana | 370/322 |
| 5,144,619 | 9/1992 | Munter | 370/353 |
| 5,173,901 | 12/1992 | Desomer | 370/465 |
| 5,570,355 | 10/1996 | Dail et al. | 370/352 |
| 5,790,806 | 8/1998 | Koperda | 395/200.82 |

*Primary Examiner*—Hassan Kizou
*Assistant Examiner*—Daniel Prévil
*Attorney, Agent, or Firm*—Guy H. Eriksen

[57] ABSTRACT

The specification relates to a broadband multiple access protocol for bi-directional hybrid fiber/coax (HFC) networks. The protocol supports downstream broadcast transmission from headend to cable modem, and also provides for allocation of bandwidth for cable modems to transmit back to the headend. Although the present invention is described in relation to an HFC network, it is also equally applicable to a cellular wireless communications environment. The protocol supports different access modes such as STM, ATM, and VL; within each subframe of a subframe/frame/masterframe structure. The protocol adapts to changing demands for a mix of circuit and packet mode applications and allocates upstream and downstream bandwidth in response to the a variety of bursty and isochronous traffic sources. In order to satisfy the quality of service requirements of varied applications, while maintaining high bandwidth efficiency, the protocol utilizes a subframe structure with subframe partitioning into regions; one region dedicated to STM payload transmission, a second region dedicated to ATM cell transmission, and a third region dedicated to VL payload transmissions.

44 Claims, 14 Drawing Sheets

METHOD AND APPARATUS ENABLING MULTIPLE ACCESS FOR MULTIPLE SERVICES AND MULTIPLE TRANSMISSION MODES OVER A BROADBAND COMMUNICATION NETWORK UTILIZING AN ADAPTIVE DIGITAL ACCESS PROTOCOL

CROSS REFERENCES TO RELATED APPLICATIONS

This application claims the benefit of U.S. Provisional Application No. 60/019,776, filed on Jun. 14, 1996. This application is related to another U.S. patent application, having a filing date of Mar. 6, 1997, and Ser. No. 08/812,469, entitled "Method and Apparatus Enabling Synchronous Transfer Mode, Variable Length and Packet Mode Access for Multiple Services Over a Broadband Communication Network," having common inventors and a common assignee.

FIELD OF THE INVENTION

This invention relates generally to digital communications and multimedia information transfer via a high bandwidth, bi-directional communications medium, and, in particular, to an access protocol and arrangement for competing stations connected via a hybrid fiber/coax network to a common headend. The invention also relates to cellular wireless networks, which are akin to fiber/coax networks, in that mobile stations do not usually communicate directly with each other, but instead depend on a base station for feedback.

BACKGROUND OF THE INVENTION

Broadband hybrid-fiber/coax (HFC) networks provide a flexible, cost-effective platform for offering a wide range of telecommunications services to residences and businesses. One of these services, high-speed multimedia access, is a particularly attractive opportunity for HFC network operators. Some of the envisioned applications include Internet access, the ability to communicate with the office while working at home, voice and video telephony, interactive game playing, etc.

Although there is substantial near-term demand for basic high-speed data access over HFC networks, it is uncertain how interactive multimedia services will evolve over time. There is a strong trend towards the integration of data and non-data services within end-user applications. Highly compelling applications such as 'audio plus data,' 'voice plus data,' and 'audio plus video plus data,' for personal computers and other devices, are all under development. Wide-area network transport infrastructures are migrating towards asynchronous transfer mode (ATM) as bandwidth and quality-of-service (QOS) issues become critical for supporting these applications.

HFC pure data systems installed in the near-term must be gracefully upgradable to support these new integrated applications since it is unreasonable to require wholesale replacement of less flexible early generation equipment that has been optimized for a restricted class of data-centric applications, e.g., those requiring only transport of Ethernet frames or IP packets. Although it may be technically possible to add limited inefficient support for other traffic types to these early systems through "extensions," it is preferable to develop a flexible basic transport structure in place from the outset to provide for future evolution as warranted by the customer needs and business considerations. Such a transport system must be capable of transporting synchronous transfer mode (STM) information, such as voice and video telephony; variable length (VL) information, such as Internet Protocol (IP) or IEEE 802.3 frames; and asynchronous transfer mode (ATM) cells.

SUMMARY OF THE INVENTION

The present invention is a method and apparatus utilizing a broadband adaptive digital access protocol (ADAPT) that supports the delivery of a wide variety of interactive and non-interactive digital services over HFC networks. Advantageously, the present invention is capable of efficiently transporting synchronous transfer mode (STM) information, variable length (VL) information, and asynchronous transfer mode (ATM) cells. A network operator can determine, for each downstream channel, a mix of tic types and the relative proportion of digital bandwidth allocated to each traffic type. The allocation of bandwidth to various traffic types can be accomplished at any time without affecting any of the installed end-user premises equipment.

Additionally, the ADAPT of the present invention is constructed within a masterframe/frame/subframe hierarchy so as to allow coordination and synchronization of downstream broadcasts with multiple access upstream channels, low jitter characteristics, and minimal delay characteristics. In both downstream (broadcast) and upstream (multiple shared access) transmission, a variable quantity of time slots are allocated for STM channels based on the volume of synchronous traffic. One STM time slot is allocated in each downstream subframe for each DSO voice channel to achieve the required bit rate of 64,000 bits per second. The boundary between the STM transmission region and the asynchronous region is dynamic, so that changes in the volume of one type of information are reflected by the total bandwidth allocation for that type of information.

The asynchronous transfer region (ATR), utilized for transporting ATM and VL information, is divided into two separate regions, ATR1 and ATR2. ATR1 is dedicated for the transmission of ATM cells and ATR2 is dedicated for the transmission of VL protocol data units (PDUs). Dividing the ATR into two regions obviates the need to include a type identifier in the header of each individual PDU. That is, ATM transmission will occur solely within ATR1 and VL transmission will occur solely within ATR2, thus minimizing the required overhead. Also, separation of the asynchronous region allows for superior quality of service (QOS) for ATM traffic without excessive medium access control (MAC) layer segmentation of VL PDUs. Therefore, the processing and bandwidth overhead associated with VL information is reduced.

Although the present invention is particularly well suited for bidirectional hybrid fiber/coax (HFC) networks with tree and branch topologies, it is also equally applicable to cellular wireless networks, which are akin to fiber/coax networks, in that mobile stations do not usually communicate with each other directly, but instead depend on a base station for feedback. Further, the present invention is also applicable to one-way HFC networks, wherein cable transport is only in the downstream (broadcast) direction, without provision for upstream bursts from cable modems to the headend.

BRIEF DESCRIPTION OF THE DRAWINGS

A more complete understanding of the present invention may be obtained from consideration of the following description in conjunction with the drawings in which.

DETAILED DESCRIPTION

AN ADAPT OVERVIEW

The present invention encompasses a system utilizing a broadband link protocol, which specifies physical (PHY) and medium access control (MAC) layers over a broadband communication network. The broadband link protocol utilized in conjunction with the present invention will hereinafter be referred to within this application as an adaptive digital access protocol (ADAPT). A variety of traffic types are time division multiplexed and modulated for integrated transport within a single radio frequency (RF) channel, or if desired, are segregated onto separate RF channels, subject to spectrum allocation and administration by a headend (HE) bandwidth manager. These traffic types include synchronous transfer mode (STM) service data units, asynchronous transfer mode (ATM) service data units, and variable length (VL) service data units.

Although the present invention is particularly well suited for bi-directional hybrid fiber/coax (HFC) networks with tree and branch topologies, and shall be so described with respect to this application, the present invention also relates to cellular wireless networks, which are akin to fiber/coax networks, in that mobile stations do not directly communicate with each other, but instead depend on a base station for feedback. Therefore, since one embodiment of the present invention is described in the context of a "headend" and a "cable modem," it is understood that the present invention may also function in the context of its wireless network counterparts. For example, a "headend" may be replaced with a "common controller" at a cellular base station and "cable modems" may be replaced with "mobile stations" or simply "stations." Further, the present invention is also applicable to one-way HFC networks, wherein cable transport is only in the downstream (broadcast) direction, without provision for upstream bursts from cable modems to the headend.

FIGS. 1 through 22, and the accompanying detailed description contained herein, are to be used as an illustrative example of a preferred embodiment of the present invention, and should not be construed as the only manner of practicing the present invention. Numerous modifications and alternative embodiments of the invention will be apparent to those skilled in the art in view of the following description. Details of the structure may be varied substantially without departing from the spirit of the invention.

Figure 1:
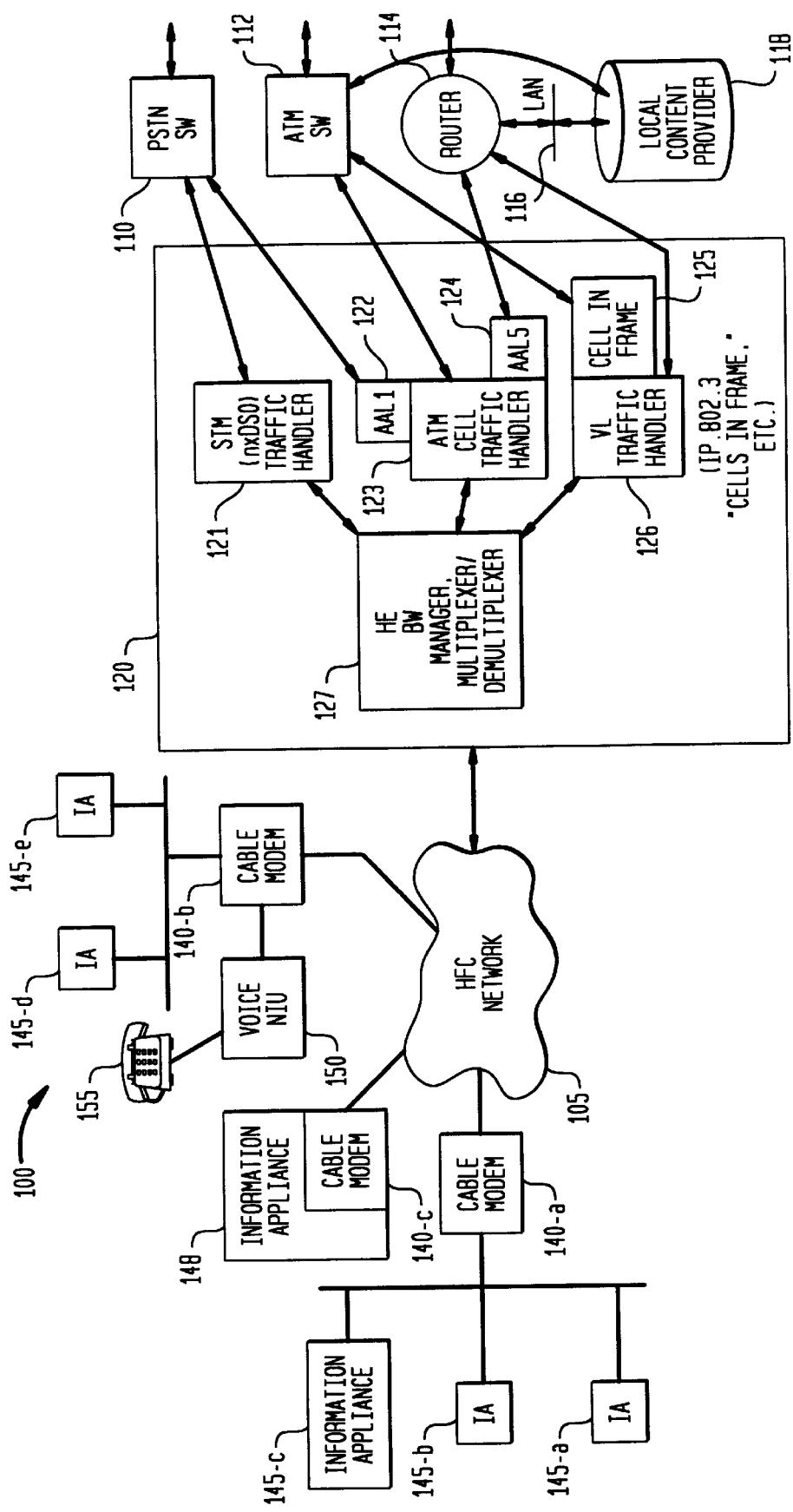
FIG. 1 illustrates an exemplary arrangement of a broadband hybrid fiber/coax network utilized in accordance with the present invention, the network connecting a headend to a plurality of cable modems for downstream signal broadcasting and allowing upstream information transmission from the individual cable modems back to the headend as well.

FIG. 1 illustrates an exemplary system operator's network 100 with which the present invention may be used. An HFC network 105 is comprised of coaxial cable with tree and branch topology, point-to-point optical fiber, or a combination of both and is characterized by a wide bandwidth. Typically, a 54–750 Megahertz (MHz) band is utilized for downstream (broadcast) cable television (CATV) frequency bands, and the frequencies between 5–42 MHz are reserved for upstream communications. The HFC 105 allows the system operator to connect cable modems to the end users.

A headend (HE) 127 is maintained at the system operator's premises 120. The HE 127 performs certain core functions, including transmission to and reception from the HFC network 105, bandwidth management for upstream and downstream communications and data transfer, as well as signal multiplexing and demultiplexing.

For example, a public switched telephone network (PSTN) 110 as shown in FIG. 1 is linked to the HE 127 through a synchronous transfer mode (STM) traffic handler 121. The STM traffic handler 121 is then linked with the HE 127. Also, the PSTN 110 can route traffic through an ATM adaptation layer (AAL) 122. By so doing, the AAL 122 converts non-ATM bit streams into ATM cells, which are then processed by the ATM cell traffic handler 123 before again being passed to the HE 127 for downstream delivery over the HFC network 105.

ATM traffic enters the system operator's premises 120 from an asynchronous transfer mode switch (ATM SW) 112, which delivers ATM cells to the ATM cell traffic handler 123. In turn, the ATM cell traffic handler 123 communicates with the HE 127, which then transmits those cells onto the HFC network 105. The ATM SW 112 can alternatively deliver ATM packets to a variable length (VL) traffic handler 126 after first converting those packets into proper VL form. This conversion takes place at the cell in frame processor 125 located at the system operator's premises 120. The VL traffic handler then forwards the data to the HE 127 for ultimate transmission over the HFC network 105.

A local content provider 118 is shown providing input to the system operator's premises 120 for ultimate dissemination over the HFC network 105. The local content provider 118 is connected to a local area network (LAN) 116. The LAN 116, in turn, is connected to a router 114, which provides the necessary interface for data from the LAN 116. The router 114 sends data directly to the VL traffic handler 126 or, if so directed, sends data through a ATM adaptation layer (AAL) 124. The AAL 124 converts non-ATM byte streams into ATM cells, which are then processed by the ATM cell traffic handler 123 before being passed to the HE 127 for downstream delivery. Data passed to the VL traffic handler 126 is converted into VL type format and is passed to the HE 127 directly for downstream delivery. Router 114 is also connected to Internet Protocol (IP) type networks (e.g.—Internet or Corporate Intranet). In this sense, HFC provides access to this Wide Area Data Network. Data units (e.g.—IP datagrams) arrive at router 114 from the outside network and are handled as those arriving from the local content provider 118.

Communications and data broadcasted over the HFC network are ultimately available at cable modems 140-a, 140-b and 140-c. The cable modem 140 converts the incoming data and communications into information usable by the information appliances 145-a to 145-e. An information appliance 145 can be a computer terminal, a phone 155, or some other processing or communication device; and a cable modem 140-c may be incorporated into the information appliance 148 itself. Additionally, a cable modem 140 may be used to provide telephony or video by utilizing a network interface unit (NIU) between the cable modem 140 and the information appliance. For example, cable modem 140-b is connected to a voice NIU 150, which provides the necessary continuity and conversion for use with a phone 155.

As previously stated, bandwidth is allocated upstream as well as downstream, so that information appliances can communicate with the HE 127. In the case of upstream transmission the sequence of processes and components described above are simply reversed. The processes performed by the HE 127 for downstream transmission are performed by the individual cable modems 140 for upstream transmission. Since the downstream communications are over a broadcast medium and the upstream communications are over a multiple access medium, there are some fundamental differences in the communication protocols for upstream and downstream transmission.

Figure 2:
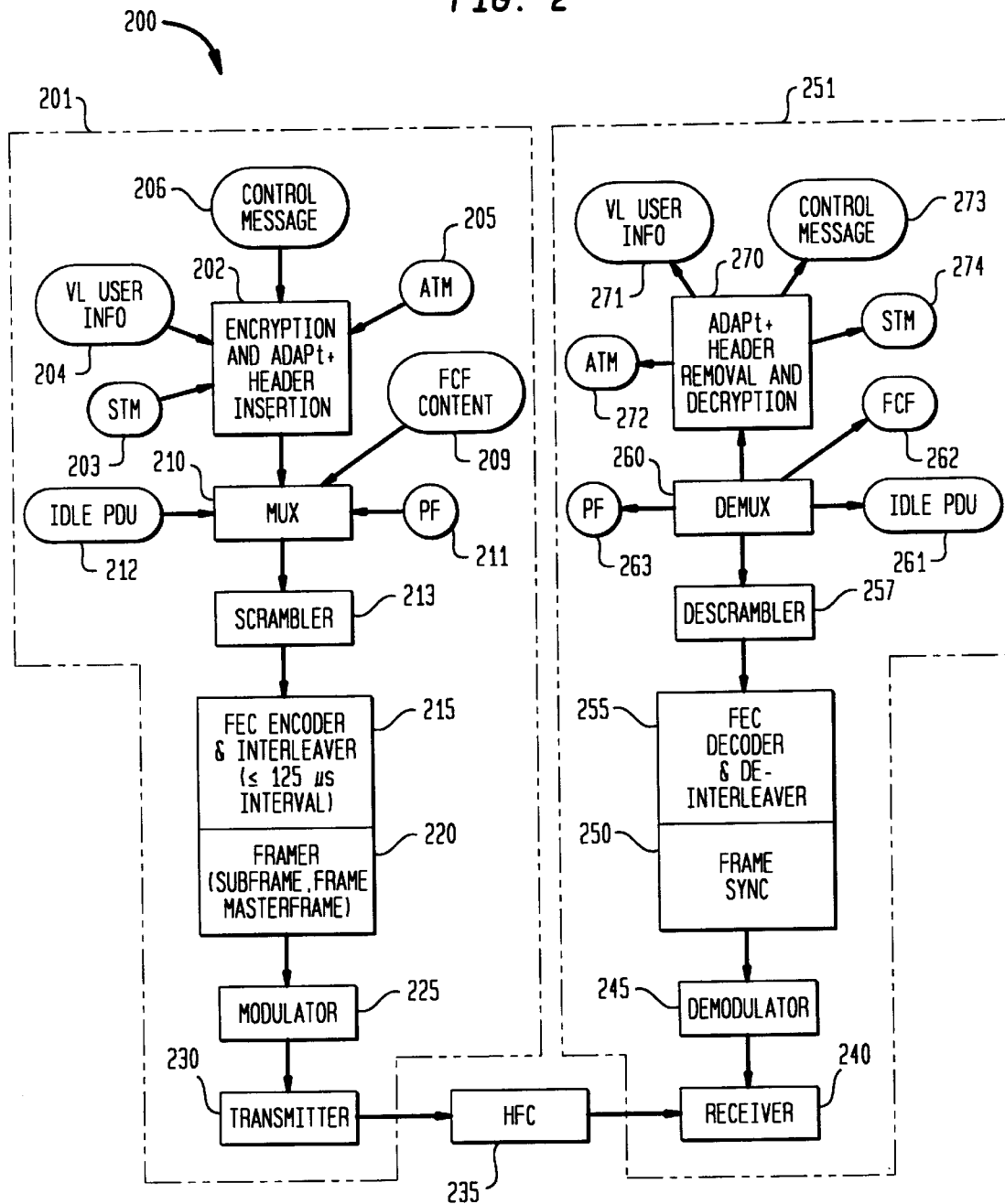
FIG. 2 is a block diagram illustrating an exemplary grouping of functional components utilized for downstream transmission in accordance with the present invention.

FIG. 2 is a block diagram illustrating an exemplary downstream transmission system 200 utilized in accordance with the present invention. Components utilized for transmission prior to broadcast over the hybrid fiber/coax (HFC) network are located at an operator's headend 201. At higher levels, queues are maintained for periodically arriving synchronous transfer mode (STM) and STM signaling bytes 203, for variable length (VL) data units 204, for fixed length asynchronous transfer mode (ATM) cells 205, and for control messages (206) which are transported as VL protocol data units (PDUs). VL data units may be of various types, including internet protocol (IP), internet packet exchange (IPX), IEEE standard 802.3 (802.3), or other variable length protocol data units (PDUs). The various queued PDUs are first processed by an encryptor 202, wherein after queued data is encrypted, an adaptive digital access protocol (ADAPT) header is appended. The output stream of the encryptor 202 is delivered to a multiplexer 210.

Traffic types other than those passing through the encryptor 202 are also generated at the headend 201. During periods when ATM, VL, or STM PDUs are not being transmitted from the headend 201 within their corresponding regions, an Idle PDU 212 is generated and transmitted. The headend 201 also generates a pointer field (PF) 211 and a fast control field (FCF) 209. Pointer fields 211, fast control fields 209, and Idle PDUs 212 are each delivered to the multiplexer 210 as well.

The various PDUs, PF, and FCF are then multiplexed into a subframe, frame, and masterframe structure. A scrambler 213 is utilized to maintain the symbol density of the transmitted data. The next functional block is a forward error correction (FEC) encoder and interleaver 215. The present invention utilizes a Reed Solomon coding scheme for forward error correction, although other methods of FEC may also be used, as would be apparent to those skilled in the art. FEC is completed within the subframe boundary to avoid excessive jitter, which will be described in more detail later. The output of the FEC encoder 215 is then prefixed with a framing byte at the framer 220, passed through a modulator 225 and broadcasted over the hybrid fiber/coax network 235 via a transmitter 230 for ultimate reception at individual cable modems 251.

The broadcasted signal is available to each cable modem receiver 240 tuned to this downstream channel. After passing through a demodulator 245, a framing byte identifies the boundary of a subframe. The payload subframe boundary is determined via a frame synchronizer 250 which analyzes the included framing byte. The framing byte is then removed and the payload is passed through the FEC decoder/deinterleaver combination 255. The output from the FEC decoder/interleaver is sent to the descrambler regardless of the outcome of FEC operations. The subframe payload is then descrambled at a descrambler 257 and made available to a demultiplexer 260 at the cable modem. The demultiplexer 260 removes the PF 263, the FCF 262, and any idle PDUs 261 which may have been included in the transmission. The remainder of the received data stream is sent through a decryptor 270 to remove the ADAPT header and decrypt the encrypted data. Various payload components are separated and processed, as will be described later in greater detail. These payload components include VL PDUs 271, ATM PDUs 272, STM PDUs 274, and control messages 273 carried as VL PDUs.

As previously stated, bandwidth is allocated upstream as well as downstream. Upstream transmission is conceptually similar to downstream transmission. For the case of upstream transmission from cable modem to headend, the processes identified in conjunction with FIG. 2 for downstream transmission are performed in the same sequential order. However, the direction of transmission is now reversed, with the cable modem performing the functions of encrypting, multiplexing, scrambling, framing, modulating, and transmitting. Similarly, for the case of upstream transmission, the headend performs the functions of receiving, demodulating, frame synchronizing, descrambling, demultiplexing, and decrypting.

There are, however, several important differences between upstream transmission and downstream transmission. First, users "burst" into an upstream frame, synchronized with the received downstream frame, and under strict time-domain control established by ranging and managed from the headend (HE). The HE determines when a cable modem may burst upstream and onto which of several upstream channels the burst may occur. To avoid interference with bursts from other cable modems in the same RF channel, the burst includes pre- and post-guardtimes. Also, a preamble is included, indicating the beginning of data within the burst and allowing for HE receiver locking. Upstream traffic is not interleaved, and forward error correction is applied at the application level within each burst, rather than at the multiplexed bytestream level.

The present invention maintains an equal frame length for downstream transmission and upstream transmission, each two milliseconds for this illustrative embodiment. Downstream frames are further subdivided into an integral number of subframes per frame. This illustrative embodiment of the present invention utilizes sixteen subframes per frame, each subframe being 125 microseconds long. Subframes are divided into four regions: a synchronous transfer region (STR), an asynchronous transfer region one (ATR1), an asynchronous transfer region two (ATR2), and a fast control field (FCF). The STR transports isochronous traffic; ATR1 transports ATM cell PDUs; ATR2 transports VL PDUs, including both bearer data and ADAPT control messages; and the FCF transports real time control information. A pointer field (PF) is also included within each subframe. The PF indicates the segmentation of a VL PDU which spills over into the next subframe.

Unlike downstream transmission, upstream burst transmission is not divided into subframes. Rather, each two millisecond upstream frame is divided into a synchronous transfer region (STR) and an asynchronous transfer region (ATR). The upstream ATR frame is further divided into three regions: a contention-based region for upstream signaling and control messages; a contention based region for bandwidth requests; and a reserved region for bearer traffic. An upstream ATR is constructed from basic slots, used for bandwidth requests in a contention mode and used to serve as a basic unit of granularity for time slot allocation with ATM and VL PDUs. For example, an ATM cell always uses six consecutive basic slots while a VL PDU uses a variable number of basic slots to better support ranging and more efficiently transport VL packets. Six basic slots are utilized to comprise a superslot.

The following description of one embodiment of the present invention precisely defines many specific values, components, and functions so as to completely illustrate the present invention. Various modifications can be made to the present invention, as would be apparent to those skilled in the art, including but not limited to specific values corresponding to masterframe, frame, and subframe timing and construct, type of modulation and demodulation employed, and bandwidth allocated for downstream and upstream transmission. For the remainder of the description of this embodiment of the present invention, downstream transmission frequency is assumed to be 5.12 Msym/s and the method of downstream modulation elected is 64 quadrature amplitude modulation (64 QAM). These elections result in a raw bit transfer rate of 30.72 million bits per second (Mbps). Similarly, the upstream transmission frequency is assumed to be 1.28 Msym/s and the method of upstream modulation elected is quaternary phase shift keying (QPSK) at 2 bits per symbol. These elections result in a raw bit transfer rate of 2.56 million bits per second (Mbps). Accordingly, the specific number of bytes per masterframe, frame and subframe, as well as the quantity of each within the transmission structure, are dependent on the elections made and will necessarily change if different transmission bandwidths or modes of modulation are chosen.

DOWNSTREAM TRANSMISSION

Figure 3:
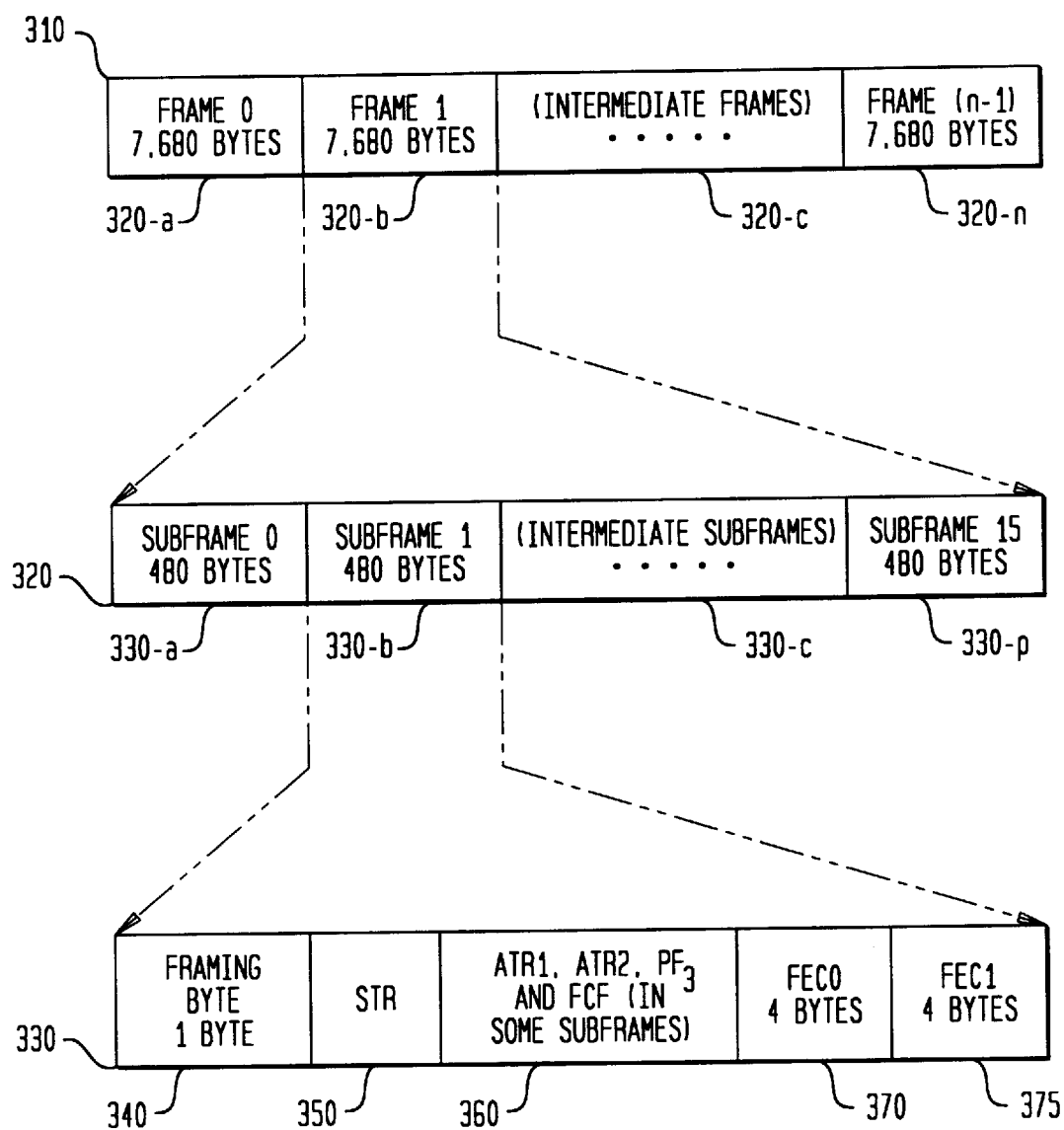
FIG. 3 is a representation of an exemplary embodiment of a downstream masterframe/frame/subframe structure as incorporated in accordance with the present invention.

FIG. 3 is a representation of an exemplary embodiment of a downstream frame structure of the present invention. A masterframe 310 is comprised of an integral number, n, of frames 320. The illustrated masterframe 310 is shown to contain frame zero 320-*a*, frame one 320-*b*, frame (n–1) 320-*n*, and an undefined number of intermediate frames 320-*c*. Since each frame 320 is two milliseconds long, and since there are n frames in each masterframe, each masterframe 310 is total of n times two milliseconds in length. Each frame 320 is comprised 7,680 bytes over two milliseconds and therefore each masterframe is comprised of n times 7,680 bytes.

Each frame 320 is comprised of sixteen subframes 330, therefore each subframe is 125 microseconds long. A typical frame, frame one 320-*b*, is shown exploded into its constituent sixteen subframes 330-*a* through 330-*p*. Intermediate subframes two through fourteen 320-*c* are shown only as a block of intermediate subframes for the sake of brevity and clarity. Each subframe is comprised of 480 bytes.

Subframe one 330-*b* is shown in exploded view to illustrate the details and various regions of a subframe. Included within a subframe are one framing byte 340, a synchronous transfer region 350, an asynchronous transfer region 360 and two blocks utilized for forward error correction (FEC). FEC0 370 includes four bytes coded in parallel from even numbered payload bytes within each subframe. FEC1 375 includes four bytes coded in parallel from odd numbered payload bytes within each subframe. More detail regarding FEC will be revealed later in this section of the application. Since each subframe 330 is comprised of 480 bytes, and one byte is dedicated to framing and eight bytes are dedicated to forward error correction, there is a total of 471 bytes utilized for information carrying within each subframe 330.

Figure 4:
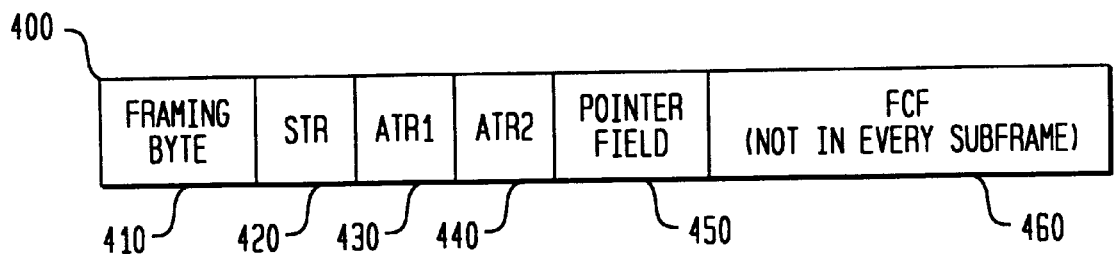
FIG. 4 is an exemplary representation for a division of information carrying bytes within a subframe into five regions.

FIG. 4 is an exemplary representation for the division of the 471 bytes dedicated to information carrying within a subframe 400 into five regions. The five regions include the synchronous transfer region (STR) 420, asynchronous transfer region one (ATR1) 430, asynchronous transfer region two (ATR2) 440, a pointer field (PF) for ATR2 450, and a Fast Control Field (FCF) 460. While it is likely that each of the first four regions will exist within each subframe of a frame, the FCF 460 is present only in the last $n_u$ subframes of each frame, where $n_u$ is the number of upstream channels associated with the specific downstream channel over which the FCF 460 is broadcasted. Also shown is the framing byte 410 that is included within each subframe.

The STR 420 transports synchronous PDUs in byte format. ATR1 430 transports fixed length ATM cells as PDUs and ATR2 440 transports variable length (VL) asynchronous PDUs. The PDUs may carry user information or may carry signaling and control information. The fast control field (FCF) 460 has a subfield which provides information about the boundary between ATR1 430 and ATR2 440 in the subsequent subframe. ATR1 430 and ATR2 440 collectively are known as the asynchronous transfer region (ATR). Because VL PDUs may be segmented and therefore partially transmitted in one subframe, a two byte pointer field (PF) 450 is used to specify the beginning location of the first full VL PDU in the next subframe.

Figure 5:
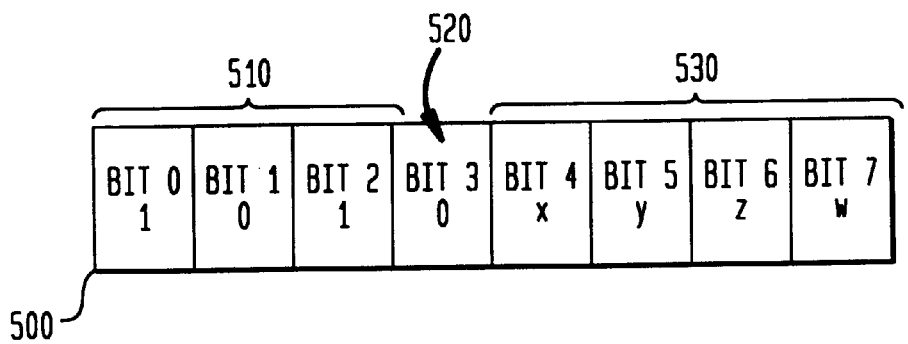
FIG. 5 is an exemplary representation of a subframe framing byte as utilized in accordance with the present invention.

FIG. 5 is an exemplary representation of a framing byte as utilized in accordance with the present invention. The first byte of a subframe is dedicated to a framing byte 500. The leftmost three bits (three most significant bits) of the eight bit pattern constitute a fixed marker pattern (FMP) 510, whose bits are fixed at '101.' The fourth most significant bit is a masterframe marker 520, whose value is '1' in each of the sixteen subframes in the first frame of a new masterframe, otherwise the masterframe marker 520 value is '0.' The four least significant bits represent a subframe counter 530. The subframe counter 530 consecutively represents each successive subframe within a frame with a different bit combination for 'xyzw,' and therefore can completely represent each of the sixteen subframes within a frame with a different bit combination value. An exemplary embodiment of the present invention simply assigns the value '0000' to 'wxyz' for the first subframe in each frame, and increments the subframe counter 530 by one for each sequential subframe, until the sixteenth and final subframe within a frame assigns '1111' to 'xyzw.'

Cable modem receivers, or station receivers in a cellular wireless environment, utilize the framing byte 500 to synchronize to subframe boundaries, and additionally to synchronize to frame and masterframe boundaries. Synchronization is needed when a cable modem initially joins the system or after a loss of synchronization. In either case, the receiver identifies each occurrence of the bit patterns '1010xyzw' or '1011xyzw,' and then identifies the bit pattern after 479 bytes to check that the subframe counter 530 has incremented by one. One exemplary embodiment of the present invention elects to repeat this bit pattern check four times prior to declaring cable modem synchronization to a subframe boundary. It is understood that the number of bit pattern checks prior to declaring synchronization may vary from one embodiment to another. Requiring more checks than four will ensure, with a greater degree of accuracy, that a synchronization has in fact occurred. Conversely, performing a bit pattern check fewer than four times reduces the likelihood that a correct declaration of subframe synchronization has occurred.

Once cable modem synchronization to a subframe boundary has been accomplished, the cable modem looks to the subframe counter to identify the position of the subframe within a frame and thus identifies the frame boundary. Having already identified the subframe and frame boundary, the masterframe boundary is identified utilizing the known boundary information and the masterframe marker 520.

The first region of information carrying bytes within a subframe is the synchronous transfer region (STR). The STR is dedicated to synchronous traffic, allocating one byte of payload per payload per active voice channel (DS0) connection. For a synchronous connection requiring an integral number, n, of voice channels per connection (n times DS0), a total of n bytes per subframe, not necessarily contiguous, are allocated per connection. In addition to the bytes reserved for DS0 and n times DS0 traffic in each subframe, one byte is provided within the STR for call supervision signaling and trunk processing information to DS0 based public switched telephone network (PSTN) network interfaces for each group of sixteen or fewer DS0 channels. The position of the DS0 byte within the STR identifies a specific DS0 connection. This mapping, established when the connection is set up, allows for simple synchronous operation at the receiver for creating a DS0 stream by extracting one byte per subframe.

The second region of information carrying bytes within a subframe is ATR1, followed by ATR2. Together, ATR1 and ATR2 comprise the asynchronous transfer region (ATR). The boundary between the STR and ATR1, and between ATR1 and ATR2, is fixed within a frame, but may be changed from frame to frame. Changing the boundaries between each of these regions is accomplished via the HE bandwidth manager (BM). The resulting division of these regions and their respective boundaries are conveyed to cable modem receivers via the FCF. The FCF specifies the STR/ATR1 and ATR1/ATR2 boundaries for the next downstream frame.

The present invention includes an integrated HE designed to facilitate three modes of transmission, STM, ATM PDUs, and VL PDUs, and further supporting various combinations of cable modems. Some cable modems are capable of supporting only STM transmissions, some support only ATM PDU transmission, and still others support any combination of two of the above modes of transmission or all three. As previously described, information regarding the length of the STR, ATR1, and ATR2 regions is provided to all cable modems in FCFs, regardless of their ability to process certain modes of transmission. For example, after the FCF has been processed and interpreted at an individual CM which is capable of supporting only VL PDU transmission and reception, the CM will utilize appropriate information regarding the length and position of ATR2, and receive and process VL PDUs contained within that region, while disregarding information specific to the STR region or ATR1. Thus, the present invention facilitates the utilization of simple, inexpensive cable modems that enable operation in only one or two modes, such as the modem that only processes VL PDUs in the above example, while maintaining comprehensive and complete transmission and reception capability for those cable modems, incorporated within the system, that facilitate transmission of all three modes.

Figure 6:
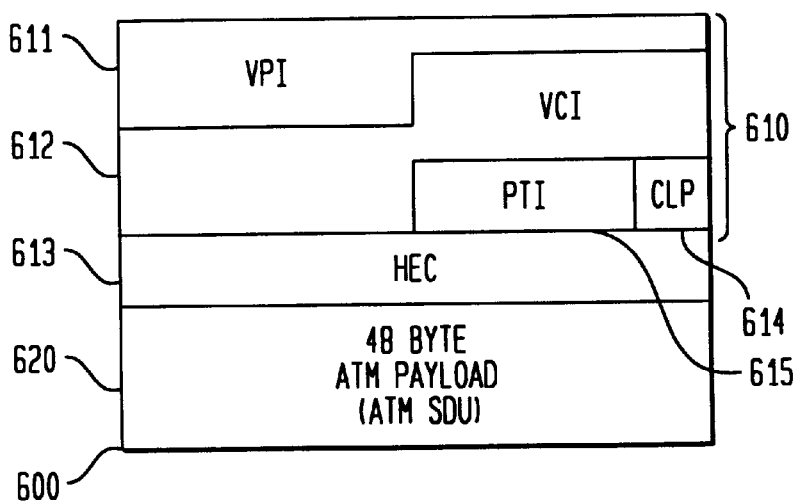
FIG. 6 is an exemplary illustration, in accordance with the present invention, of byte allocation for an ADAPT PDU with an ATM cell as payload.

FIG. 6 is an exemplary illustration, in accordance with the present invention, of byte allocation for an ADAPT ATM PDU 600. ATM PDUs are transmitted downstream within ATR1 of the asynchronous transfer region. ATR1s in successive subframes are concatenated to provide a bytestream for carrying ADAPT ATM PDUs 600, thereby allowing ATM PDUs 600 to cross subframe, frame, and masterframe boundaries. A five byte ATM header serves as both an ATM cell header and as an ADAPT header 610. In a standard network-to-network interface (NNI) format, an ATM header and therefore an ADAPT header 610 as well, contains the following fields: a twelve bit virtual path identifier (VPI) 611, a sixteen bit virtual channel identifier (VCI) 612, an eight bit header error control field (HEC) 613, a one bit cell loss priority field (CLP) 614, and a three bit payload type identifier (PTI) 615.

Cable modem receivers process the first five bytes of every PDU in the ATR1bytestream to verify the HEC field 613. The polynomial utilized for HEC, '$1+x+x^2+x^8$', the correction and detection states, and the transitions are standard to ATM cells with a NNI format. With fixed length ATM cells in the byte stream generated by concatenated ATR1s, the standard ATM cell delineation method, being well known by those skilled in the art, is used for ADAPT PDU delineation at the receiver. After verifying HEC 613, the cable modem receiver analyzes the VPI 611 to see if the PDU is destined for that cable modem. The ATM header VPI 611 is utilized by the present invention as a surrogate for the receiving cable modem address.

When there are not enough ATM cells queued at the HE to completely fill the current ATR1, the portion of ATR1 that is otherwise unused is filled with idle ATM PDUs. An idle ATM PDU is fifty-three bytes in length, and therefore maintains synchronization within ATR1. The five byte ATM header for an idle ATM PDU includes a virtual path identifier (VPI), used as a surrogate cable modem address, just as an ATM PDU with payload does. The VPI for an idle ATM PDU is set to '1111 1111 1111,' which is a discard address. The forty-eight byte pseudo-payload is appended to the header to maintain proper spacing and synchronization within ATR1, but no data is appended within that space. Idle ATM PDUs therefore, provide a method of padding ATR1 when the headend bandwidth manager allocates more bandwidth to ATR1 than required for the downstream transmission of ATM cells queued at the headend.

Figure 7:
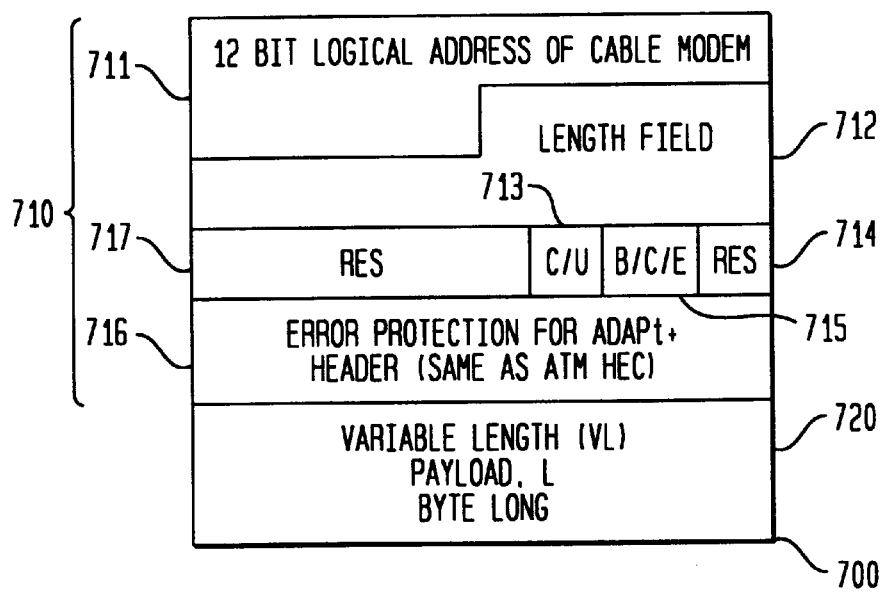
FIG. 7 illustrates an exemplary variable length (VL) payload with an ADAPT header for downstream transmission, in accordance with the present invention.

FIG. 7 illustrates an exemplary variable length (VL) payload with an ADAPT header for downstream transmission, in accordance with the present invention. ADAPT VL PDU segments 700 are transmitted within the second asynchronous transfer region, ATR2. ATR2s from successive subframes are concatenated to create a bytestream for VL PDUs. It is important to note the difference in terminology between an ADAPT VL PDU segment 700 and a VL PDU. A VL PDU represents the data frame or datagram from a higher level variable length PDU. An ADAPT VL PDU segment 700, however, is a VL PDU which has been segmented to a size no greater than MAXSIZE. An ADAPT VL PDU segment 700 is transmitted downstream within ATR2. Cable modem receivers process the segments as a VL PDU bytestream and reestablish the original characteristics of the VL PDU. An ADAPT VL PDU segment 700 may alternatively be referred to as a "VL PDU segment," a "VL segment," a "PDU segment," or simply as a "segment." A VL PDU may alternatively be referred to as a "VL frame," a "VL datagram," or a "higher level VL PDU."

The payload 720 of an ADAPT VL PDU segment can be the whole or a portion of an Internet protocol (IP) datagram, an I.E.E.E. 802.3 frame (802.3), or an ADAPT control message. The payload may also be one or more ATM cells sent back-to-back to the same cable modem, in which case the ATM headers for all but the first ATM cell in the ADAPT VL PDU segment 700 are redundant and may be removed.

An ADAPT VL PDU segment 700 contains a five byte header 710 which includes the following fields within it: a twelve bit logical address 711 for the destination cable modem, a twelve bit length field, a one bit C/U field 713, a two bit B/C/E field 715, an eight bit HEC field 716, a one bit field reserved for future use 714, and a three bit field reserved for future use 717. The HEC field 716 within an ADAPT VL PDU segment 700 protects the entire five byte header 710 and provides for the capability for single bit error correction. The size of the header 710 and the HEC field 716 are identical to those for ATM cells. The polynomial, correction and detection states, and transitions are also the same as those of the ATM HEC.

The one bit C/U field 713 is used to specify whether the present ADAPT VL PDU segment 700 contains user information or a control message. The two bit B/C/E field 715 specifies whether the VL PDU segment carries the beginning, continuation, or end segment of a higher level PDU. A beginning segment VL PDU segment is indicated with a B/C/E field 715 equal to '00,' a continuation segment VL PDU segment is indicated with a B/C/E field 715 equal to '01,' an ending segment VL PDU segment is indicated with a B/C/E field 715 equal to '10.' If a higher level VL PDU is carried as payload within a single ADAPT VL PDU segment 700, the B/C/E field 715 is equal to '11.'

The twelve bit length field 712 can specify an ADAPT VL PDU segment 700 up to 4095 bytes. Accounting for the five byte VL header, a total of 4090 bytes of VL payload may be described by the length field. An exemplary embodiment of the present invention therefore specifies the maximum length in bytes, MAXSIZE, for an ADAPT VL PDU segment 700. Therefore, if a higher level VL PDU is to be transmitted downstream and is larger than MAXSIZE minus five, the higher level VL PDU will first be segmented into one or more segments and transmitted downstream as separate ADAPT VL PDU segments 700, concatenated at the receiver, and reassembled with the aid of information from the B/C/E field 715.

Idle PDUs fill the unused portions of ATR2. The format for an idle PDU transmitted in ATR2 is the same as that of an ADAPT VL PDU segment 700. An idle PDU has a B/C/E field 715 equal to '11,' since the payload is of zero length and fits in one ADAPT VL PDU 700. The cable modem logical address 711 is the discard address of '1111 1111 1111.' The length of the payload is zero, therefore the length field 712 is equal to '0000 0000 0000.'

The twelve bit logical address 711 for the destination cable modem is explicitly specified in the VL header. Various addresses out of the 4095 possible combinations for this field are reserved and not used as specific cable modem addresses. Some examples include reservation for broadcast addresses, reservation as a discard address utilized in conjunction with idle PDUs, reservation for multicasting. Logical addresses not reserved for other purposes are available for identification of individual cable modems.

As introduced earlier, the ATR2s of successive subframes are concatenated to provide an ATR2 bytestream facilitating the transmission of VL PDUs. Since each VL PDU segment 700 contains a length field 712 in its header, a receiving cable modem is able to discern the VL PDU segment boundary from the bytestream, thus identifying the end of one VL PDU segment and the beginning of the next sequential VL PDU segment.

In this fashion, a cable modem is self synchronizing. However, when a cable modem first joins the network, it needs to identify the first VL PDU segment boundary in order to establish synchronization. Also, a cable modem which receives or processes erroneous data may cause the receiver to lose synchronization. Therefore, a two byte pointer field is incorporated at the end of each ATR2 within a subframe to provide for quick resynchronization with a VL PDU segment boundary.

Because ATR2 is treated as a bytestream, the last VL PDU segment 700 in the ATR2 of a subframe can cross subframe, frame, and masterframe boundaries. VL PDU segments will appear in consecutive order in the ATR2s of successive subframes until the entire higher level VL PDU is transmitted. At the end of each subframe, the headend recognizes the number of bytes transmitted and the number of bytes remaining to completely transmit a VL PDU segment. The HE also knows the length of the STR and ATR1 regions. This information is utilized to provide for VL PDU segment boundary identification at the receiver.

Figure 8:
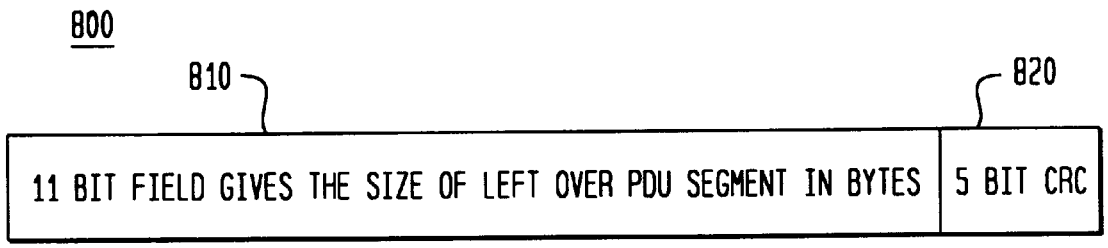
FIG. 8 represents an exemplary embodiment of a two byte pointer field (PF), in accordance with the present invention.

FIG. 8 represents an exemplary embodiment of a two byte pointer field (PF) 800, in accordance with the present invention. The bits of the PF are divided into two distinct fields. First, a length field of eleven bits 810 is dedicated to conveying information about the remaining untransmitted length of an ADAPT VL PDU segment at the end of the instant subframe. A five bit error protection field 820 is also included within the PF 800. The error protection field dedicates four bits for the result of a cyclic redundancy code (CRC) calculation and one bit for parity.

Figure 9:
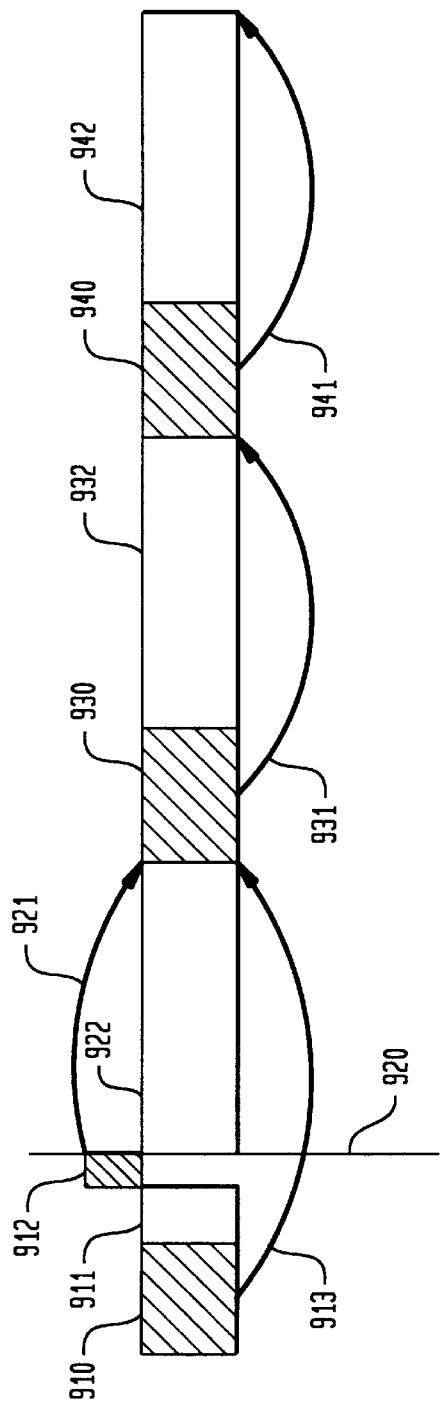
FIG. 9 is an exemplary illustration of the utilization of length field information contained within a downstream ADAPT VL PDU segment header, combined with a subframe pointer field, to mark the end/beginning of individual PDUs.

FIG. 9 is an exemplary illustration, in accordance with the present invention, of the utilization of the length field contained within a downstream ADAPT VL PDU segment header and a subframe PF to mark the boundary between adjacent VL PDU segments within an ATR2 bytestream. The VL PDU segment header 910 of a segment which has not been completely transmitted within a subframe boundary provides total segment length information about its associated PDU segment payload 911. The total length in this illustrative example is shown to traverse the subframe boundary 920 and the remainder of the PDU segment payload 911 is transmitted in the subsequent subframe as PDU segment payload 922. Length arrow 913 describes the PDU segment payload total length and points to the beginning of the next VL PDU segment header. Pointer Field (PF) 912 provides direct information regarding the byte position of the beginning of the header of the first full PDU segment in the next subframe. Thus, in effect, the PF 912 points to the same location as does the length field in the header 910. PF is particularly useful when one or more PDUs are discarded due to transmission errors. When one or more PDUs are discarded, the subsequent PDU boundary cannot be easily identified without a PF. Including PF within a PDU therefore allows PDU boundary identification at the next subframe.

The next sequential VL PDU segment header 930 provides total length information for its respective VL PDU segment payload 932 by pointing 931 to the beginning of the next VL PDU segment header 940. Similarly, the following VL PDU segment header 940 provides total length information for its respective VL PDU segment payload by pointing 941 to the beginning of the next sequential VL PDU segment header.

The process described above, therefore, marks the beginning of the first ATR2 PDU segment in the next sequential subframe, allowing for synchronization and resynchronization to an ADAPT VL PDU segment boundary. This synchronization process, however, is only necessary for initial identification of a VL PDU segment boundary, or for resynchronization after a synchronization loss. Once initial synchronization is achieved, implicit and explicit length information is utilized for continuing self synchronous operation. Also, the VL PDU segment header HEC is used for each VL PDU segment, for further confirmation of synchronization within VL PDU segments.

Figure 10:
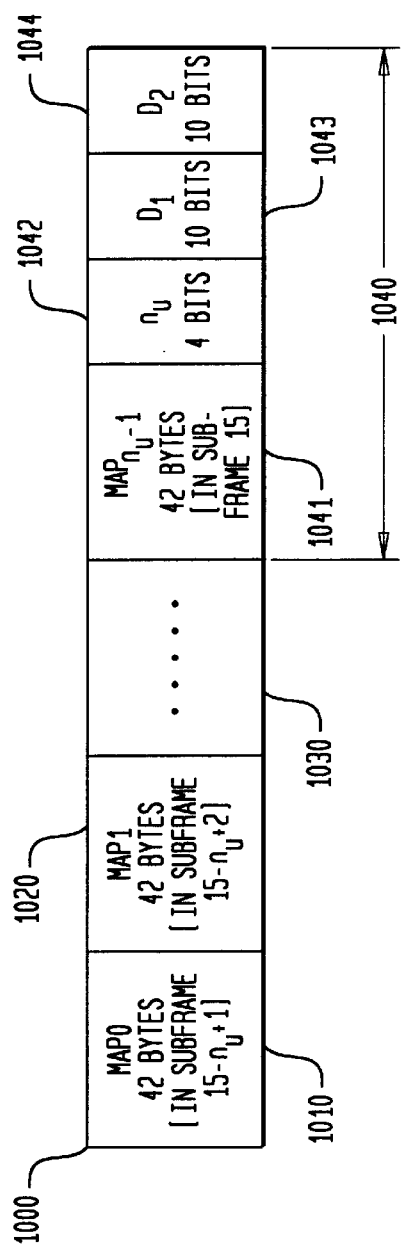
FIG. 10 is an exemplary depiction of a downstream fast control field (FCF), as utilized in accordance with the present invention.

FIG. 10 is an exemplary depiction of a downstream fast control field (FCF) 1000 as utilized in accordance with the present invention. Although a field within the asynchronous transfer region (ATR), the FCF 1000 is confined within a frame. The FCF 1000 is included in the last $n_u$ subframes of every frame, just after the two byte PF. The purpose of the FCF 1000 is to control the basic operation of the ADAPT medium access control (MAC) in real time. This aspect is particularly important, since the control information transported between headend and modem through the FCF tends to be relatively delay sensitive. In particular, the FCF 1000 provides six types of information to individual cable modems. First, the FCF 1000 informs the cable modems of the location of the boundary between the STR and the ATR1. Second, the FCF 1000 informs the cable modems of the location of the boundary between the ATR1 and the ATR2. Third, the FCF 1000 informs the cable modems of the location of the boundary between the STR and ATR for upstream transmission. Fourth, the FCF 1000 provides the cable modems with success/failure results from the contention slots of the previous upstream frame. Fifth, the FCF 1000 informs the cable modems of the reservation/contention status of each upstream basic slot for the next upstream frame. Lastly, the FCF 1000 informs the cable modems of basic slot allocation within the ATR for the next upstream frame.

The downstream FCF contains one upstream ATR MAP for each upstream channel, each MAP being forty-two bytes in length. MAP0 1010 is that portion of an FCF which is transmitted in subframe $(16-n_u)$, where $n_u$ is the number of upstream channels associated with the downstream channel. MAP1 1020 is that portion of an FCF which is transmitted in subframe $(17-n_u)$. Intermediate MAP fields 1030 are also transmitted in subsequent subframes until the last subframe within a frame. MAP($n_u$-1) 1041, along with fields $n_u$ 1042, $D_1$ 1043, and $D_2$ 1044, are the final portions of an FCF to be transmitted within each frame, and are transmitted in subframe fifteen. That portion of an FCF transmitted in subframe fifteen 1040 is forty-five bytes in length, the $n_u$ 1042, $D_1$ 1043, and $D_2$ 1044 fields comprising an additional three bytes to the forty-two bytes of an accompanying MAP.

The $n_u$ field 1042 is a four bit representation for the number of upstream channels associated with the downstream channel transmitting the FCF 1000. Being four bits, the $n_u$ field 1042 can therefore specify up to sixteen upstream channels with any one downstream channel.

The $D_1$ field 1043 specifies the boundary between the STR and ATR1 in the next downstream frame. The boundary specification is conveyed to the cable modems in terms of length of the STR in bytes. The $D_2$ field 1044 specifies the boundary between the ATR1 and the ATR2 in the next downstream frame, in terms of the sum of the lengths of the STR and ATR1. The boundary specification is conveyed to the cable modems in terms of length of the ATR1 in bytes.

FCF transmission downstream is segmented. The last subframe in every frame carries a forty-five byte MAP for upstream channel number $n_u$-1, the $n_u$ field 1042, the $D_1$ field 1043, and the $D_2$ field 1044. Each of the preceding $n_u$-1 subframes carries a forty-two byte MAP, but no $n_u$ or D fields.

Figure 11:
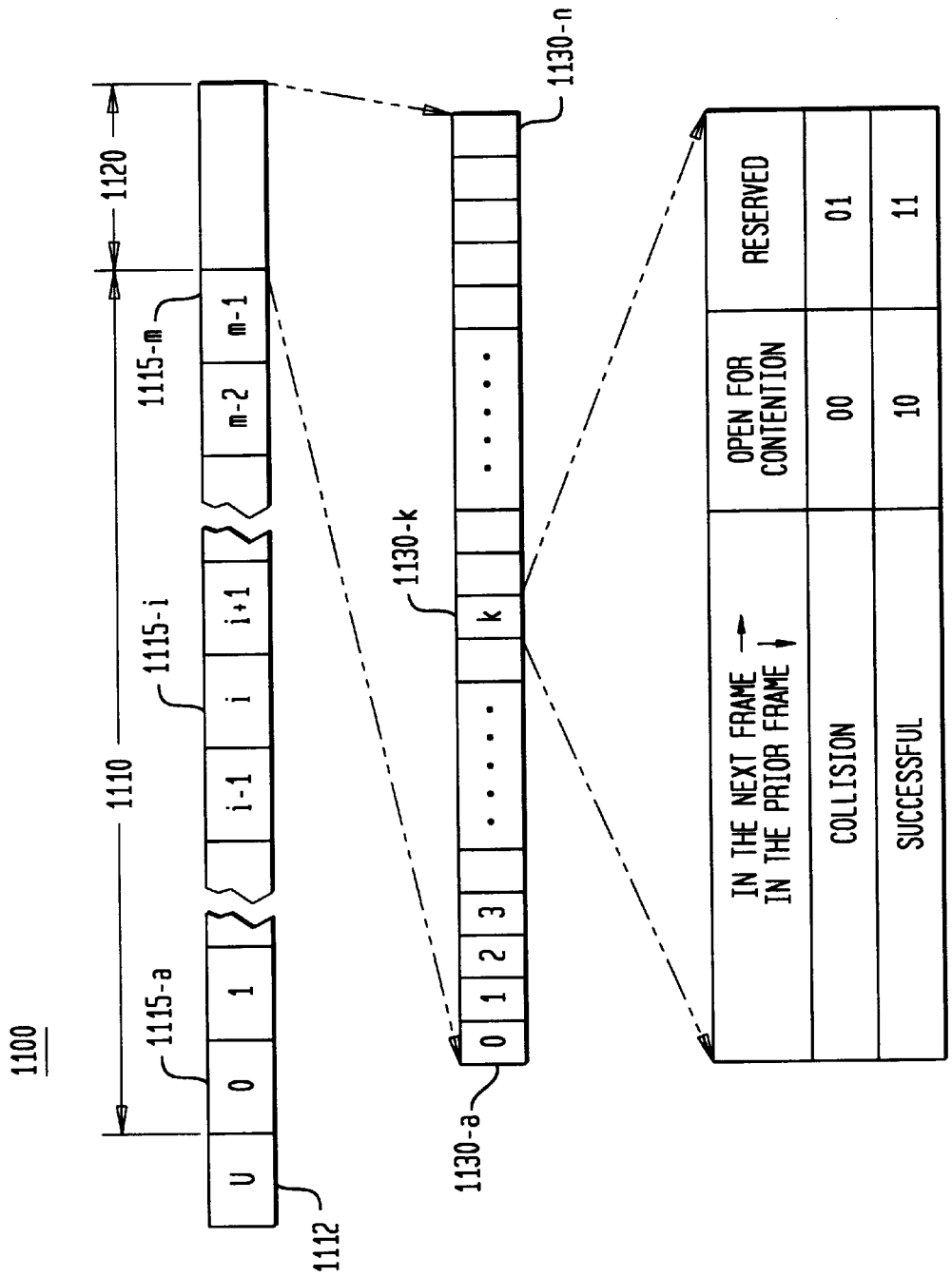
FIG. 11 is an exemplary representation, in accordance with the present invention, of the structure of a downstream MAP field, with exploded view of a status map for basic slots field.

FIG. 11 is an exemplary depiction, in accordance with the present invention, of the structure of a downstream MAP field 1100 with an exploded view of the status map for basic slots 1120. MAP is comprised of three major fields; an upstream boundary specification 1112, an upstream bandwidth allocation map for ATR 1110, and a status map for basic slots 1120.

The upstream boundary specification (U) 1112 conveys to the cable modems the boundary location between the synchronous and asynchronous regions within the next upstream frame. U is an eight bit long binary number and specifies the boundary region in units of basic slots. A basic slot is a subdivision of twelve contiguous bytes within the upstream transmission frame structure. Basic slots will be described in greater detail in this application, specifically during that portion of the detailed description describing upstream transmission.

The upstream bandwidth allocation map for ATR 1110 contains 'm' subfields, 1115-*a* to 1115-*m*. Each subfield 1115 is three bytes in length. Each subfield 1115 is further subdivided into subordinate subfields as well. The upstream bandwidth allocation map for ATR 1110, the subfields 1115, and the subordinate fields will be described in greater detail shortly.

The status map for basic slots 1120, maintains a 2 bit status indicator, 1130-*a* to 1130-*n*, for each basic slot within an upstream frame. The number 'n' represents the maximum number of basic slots in an upstream frame. The status indicator for slot 'k,' 1130-*k*, informs cable modems of the status of slot 'k,' 1130-*k*, in the previous upstream frame (i.e.—whether there was a collision or whether transmission was successful) and reports the status of allocation for slot 'k,' 1130-*k*, in the next upstream frame (whether slot is open for contention or reserved in the next upstream frame). The size of the status map for basic slots 1120 is determined by the number of basic slots 'n.' As will be subsequently described, since the upstream frame size is 640 bytes and since each basic slot is twelve bytes long, the maximum number of basic slots within an upstream frame is fifty-three. If 'n' is chosen to be greater than or equal to the number basic slots, then each upstream frame is adequately provided with a status map for basic slots 1120. Therefore, we can completely define the status for each upstream basic slot. Allocating fourteen bytes to the status map for basic slots field 1120 provides a total of 112 bits. Since a status indicator 1130 is two bits in length, a total of fifty-six status indicators 1130 are available, or 'n' equals fifty-six.

Figure 12:
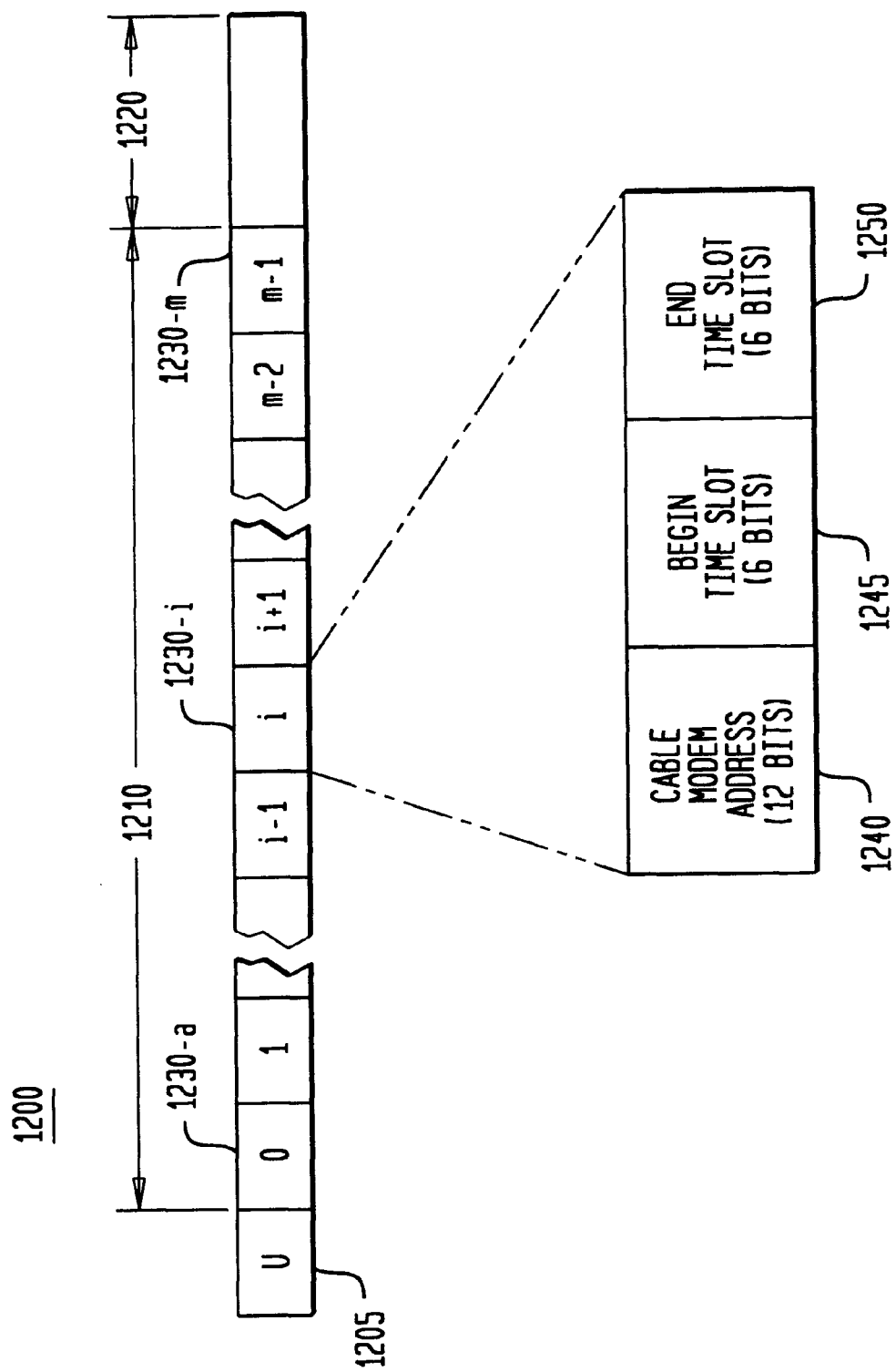
FIG. 12 is an exemplary representation, in accordance with the present invention, of the structure of a downstream MAP field, with exploded view of the upstream bandwidth allocation map for ATR field.

FIG. 12 is another exemplary representation, in accordance with the present invention, of the structure of a downstream MAP field 1200, but this time with an exploded view of the upstream bandwidth allocation map for ATR 1210. Previously examined, but included in this illustration for completeness, are the upstream boundary specification (U) 1205 and the status map for basic slots 1220. The upstream bandwidth allocation map for ATR 1210 contains 'm' subfields, 1230-*a* to 1230-*m*. Each subfield 1230 is three bytes in length and is subdivided into subordinate subfields. A source address subordinate subfield 1240 contains a twelve bit address of the cable modem (CM) for which permission is being granted to transmit in the next upstream frame. Also included as subordinate subfields are the six bit begin time slot 1245 and the six bit end time slot 1250.

The source address subordinate subfield 1240 is used to convey information, from the bandwidth manager at the headend, to the cable modems, about which CM address has been granted permission to transmit in the next upstream frame. In the MAP 1200, the source address subordinate subfield 1240 is used to identify the CM to which the permission is being given, irrespective of whether the cable modem is transmitting and/or receiving ATM traffic, VL traffic, or both. All twelve bits of the source address subordinate subfield 1240 are set equal to '1' to indicate that a specified sequence of basic slots together form an upstream contention superslot for control purposes, such as signaling and ranging. Therefore, the source address subordinate subfield 1240 value of '1111 1111 1111' is not available as a CM address.

As previously noted, there are 'm' subfields 1230 included within the upstream bandwidth allocation map ATR 1210. The value of 'm' must be greater than or equal to the maximum number of possible ATM or VL PDU allocations per frame. Since an upstream frame is composed of 640 bytes, no more than eight complete ADAPT ATM PDUs with payload ATM cells may be transmitted upstream in any one frame. Assuming that an ATM PDU with payload is shorter in length than a VL PDU with payload, then setting 'm' equal to nine provides an adequate number of subfields 1230 within the upstream bandwidth allocation map for ATR field 1210. Therefore MAP default values of 'm' equal to nine and 'n' equal to fifty-six are initially established. The values of 'm' and 'n' may be changed if necessary.

After receiving MAP information in the downstream subframe corresponding to the upstream channel within which a particular CM transmits, each CM allocated within that upstream channel yields to a known fixed offset delay, and then transmits a new upstream frame. The fixed offset delay has a fixed value for each CM, determined individually for each CM, and dependent upon the distance between CM and HE. The value of the fixed offset delay is computed at the HE, and transmitted by the HE to the CM as a slow control message. As previously described, the MAPs for different upstream channels are transmitted in different subframes of a downstream frame and therefore, reception by the HE of upstream messages for different upstream channels are received shifted in time by an integral multiple of the length of a subframe. Accordingly, the upstream frame processing tasks supported at the HE bandwidth manager are distributed over time. That is, generation of MAP information, for transmission in the FCF, is not concentrated in short, computationally dense bursts, but rather extended over many subframes (as many subframes as there are upstream channels). Each two consecutive MAPs for an upstream channel are separated in time by the duration of one frame. Frame duration is selected to be slightly longer than the round trip propagation delay between the headend and the furthest cable modem, plus the processing time needed for MAP generation at the HE, plus the processing time needed at the CM to interpret the MAP. Therefore, the MAP for each upstream frame is guaranteed to arrive at each cable modem within the next upstream frame. As a consequence of the combination of a rapid report time for MAP information and the distribution over time of MAP generation at the HE, streamlined and efficient control over the operation of the medium access control (MAC) for a plurality of upstream channels associated with one downstream channel is maintained.

Figure 13:
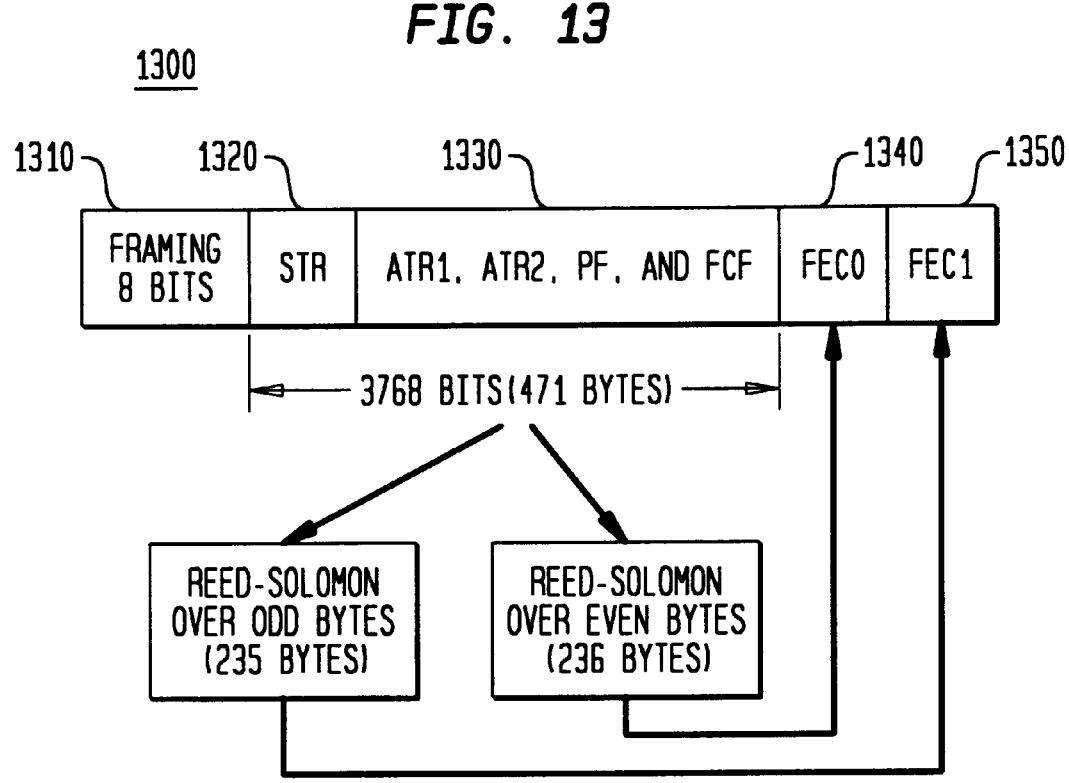
FIG. 13 illustrates an exemplary model for forward error correction (FEC) and interleaving over one subframe of downstream transmission, in accordance with the present invention.

FIG. 13 illustrates an exemplary model for forward error correction (FEC) and interleaving 1300. One subframe of 480 bytes is represented over 125 μs. As previously described, a framing byte 1310 is incorporated within each subframe. Also included in each subframe are eight bytes for forward error correction. This space is divided into two error correction syndromes, FEC0 1340 and FEC1 1350, each four bytes long. Therefore 471 bytes remain for the payload itself, whether allocated within the STR 1320, the asynchronous information and control region 1330, or a combination of both.

Some traffic types, such as compressed video, require a very low residual error rate either because the applications demand a low error rate or because the delay requirements associated with that traffic type preclude an automatic retransmission request (ARQ) type retransmission at the datalink layer. Other traffic types, such as voice telephony, may not allow datalink layer retransmissions but can tolerate moderate error rates.

The present invention utilizes FEC for each subframe payload individually so that the FEC blocks do not traverse subframe boundaries. This arrangement provides for extremely tight jitter control. Each 471 byte payload subframe is divided into two FEC blocks of even and odd bytes. Each of these two blocks is Reed Solomon coded with four bytes of FEC overhead, thus creating a 240 and a 239 byte FEC coded payloads. Although a Reed Solomon coding scheme is utilized for FEC in one embodiment of the present invention, other methods for FEC may also be used, as would be apparent to those skilled in the art. At the transmitter, the two FEC operations are performed in parallel using two FEC coders and thereby avoiding any extra delay in encoding. The transmitter sends the subframe bytes in original order followed by the FEC bytes. Advantageously, the interleaving is performed through FEC blocks of odd and even bytes without changing the order of transmission of data payload bytes (STM and asynchronous data). This arrangement of byte-wise interleaving over a subframe allows delay sensitive traffic within a subframe to be processed at a receiver without an FEC check, and therefore without any additional delay due to interleaving. Also, the byte-wise interleaving over a subframe, as performed in accordance with the present invention at the PHY layer, does not destructively interfere with any upper layer interleaving that has been performed at the application layer.

At the receiver, the two FEC blocks are decoded by passing them sequentially through a single standard FEC decoder, thus reducing the cost of a cable modem. Therefore, the FEC utilized with an exemplary embodiment of the present invention is characterized by synchronization within individual subframes and systematic interleaving. Only FEC0 1340 and FEC1 1350 are interleaved. Therefore, synchronizing forward error correction and interleaving within a 125 microsecond subframe utilizing an integral number of FEC blocks provides jitter-free STM transmission, since it is not necessary to receive more than a single subframe of transmission at a cable modem before interpretation of FEC code and deinterleaving. Although the parallel FEC description is with respect to two FEC coders, the present invention may also be utilized generally with an interleaving depth of n, requiring n coders. The exact number of decoders at the receiver may be one, as described herein with respect to sequential decoding or greater, if parallel decoding is desired. The quantity of decoders employed at individual CMs ultimately is a design decision made by the system engineer; balancing the additional cost incurred if each CM were to possess more than one decoder, against the need to mitigate the inherent delay associated with sequential decoding.

The present invention, when transmitting, incorporates a self synchronous scrambler prior to application of FEC. At the receiver, decoding/deinterleaving is followed by a descrambler. In order to maintain bit count integrity for the descrambler and to avoid error propagation, the FEC decoder/deinterleaver at the receiver passes all the decoded bits to the descrambler, even if uncorrectable errors are discovered. Descrambling is disabled when a cable modem is hunting to regain synchronization to the subframe boundary. Descrambling is resumed when synchronization is reestablished.

UPSTREAM TRANSMISSION

Having fully described downstream transmission, with details regarding frame and PDU structure, of an exemplary embodiment of the present invention, a description specifying an exemplary embodiment for upstream frame and PDU structures follows. First, synchronous transfer mode (STM) traffic from voice or video telephony requires strict control of jitter. Because of this requirement, a relatively small sized downstream communication subframe, with a length of 125 microseconds, was chosen. Sixteen subframes were designated to comprise a downstream frame. A suitable frame structure is also required for the upstream direction. High upstream physical (PHY) layer overhead encourages transmitting upstream STM in larger single bursts from the cable modem (CM). Therefore, one embodiment of the present invention utilizes a two millisecond frame structure to match the downstream frame structure and allow for upstream frame synchronization with the equally sized downstream frame. Like the downstream frame structure, an integral number of upstream frames are incorporated into one upstream masterframe. However, unlike the downstream frame, the upstream frame is not comprised of subframes. This combination of upstream frames and masterframes provides a balance between low PHY layer overhead and low packetization delay for STM communications.

For the remainder of the description of exemplary embodiment of the present invention, upstream channel bandwidth is chosen at 1.8 MHz in the 5–42 MHz range and upstream symbol rate is chosen to be 1.28 megasymbols per second (Msym/s). The method of upstream modulation elected is quaternary phase shift keying (QPSK) at 2 bits per symbol. These elections result in a raw bit transfer rate of 2.56 million bits per second (Mbps). Various modifications can be made to the present invention, as would be apparent to those skilled in the art, including but not limited to specific values corresponding to masterframe and frame timing and construction, type of modulation and demodulation employed, and bandwidth allocated to upstream channels. Accordingly, the selection of specific lengths for masterframes and frames, as well as the quantity of each are dependent on the elections made, and will necessarily change if different bandwidths or modes of modulation are chosen.

Figure 14:
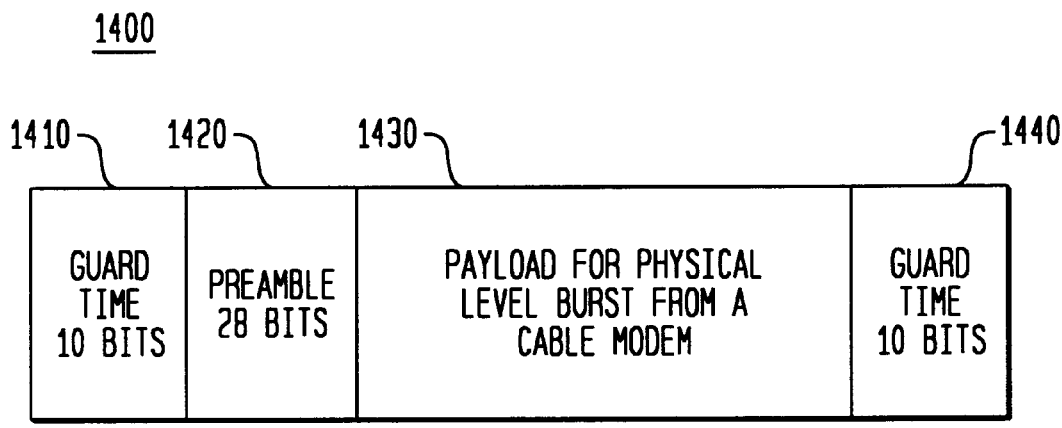
FIG. 14 illustrates an exemplary frame structure, in accordance with the present invention, of an ADAPT upstream burst transmission.

FIG. 14 illustrates an exemplary frame structure 1400, in accordance with the present invention, of an ADAPT upstream burst transmission. A transmission front guard band 1410 and transmission end guard band 1440 are each ten bits long, and a preamble 1420 is twenty-eight bits in length. The preamble 1420 is a fixed bit pattern used to indicate the start of data within a burst. Guard bands are utilized to compensate for inaccuracies inherent with CM ranging and synchronization with the HE.

Figure 15:
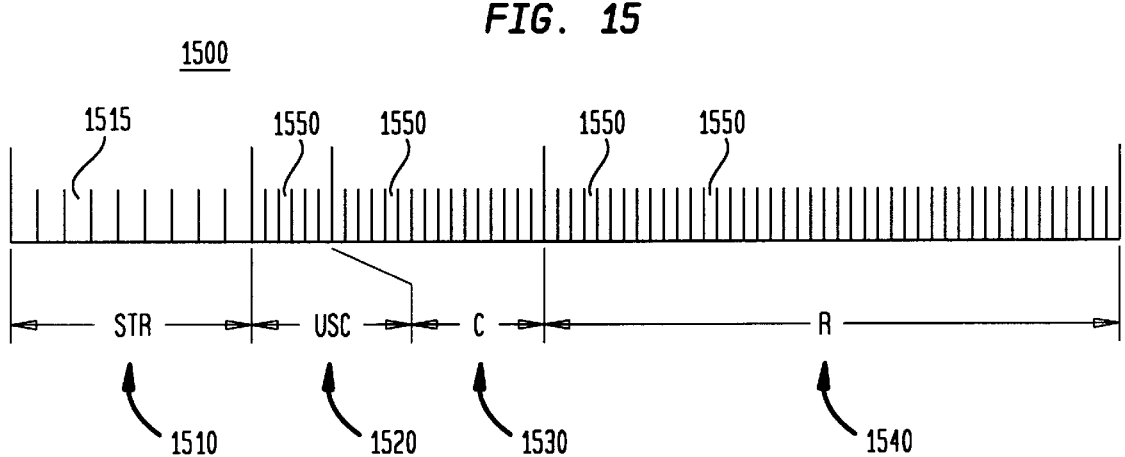
FIG. 15 illustrates an exemplary upstream transmission frame and slot structure, in accordance with the present invention.

FIG. 15 illustrates an exemplary upstream transmission frame 1500 and slot structure, in accordance with the present invention. As previously described, an upstream frame 1500 is two milliseconds long and synchronized with transmitted downstream frames. At 2.56 Mbps, there are a total of 640 bytes available within each frame 1500 and an integral number of frames 1500 comprise a masterframe. A masterframe is synchronized with a corresponding downstream masterframe. The frame structure 1500 consists of four distinct regions; an STR region 1510 for synchronous voice or video telephony communication, an upstream slow control (USC) region 1520, a contention region (C) 1530, and a reserved region (R) 1540.

The STR region 1510 consists of individual DS0 STM time slots 1515, each twenty-seven bytes long. One STM time slot 1515 is dedicated to each upstream DS0 connection. Providing an STM time slot within each upstream frame 1500 allows sixteen bytes of STM information to be transmitted each two milliseconds, thereby facilitating low delay transmission for STM communications.

The upstream slow control region (USC) 1520, contention region (C) 1530, and reserved region (R) 1540 collectively comprise the upstream asynchronous transfer region (ATR). The ATR is composed of a multiplicity of basic slots 1550, each basic slot being twelve bytes in length. Accumulating an integral number of bytes to form a basic slot provides the granularity required for upstream transmission. User data PDU time slots are formed by combining multiple successive basic slots.

The contention region 1530 contains multiple basic slots in each frame. The exact number is variable and is changed by the headend bandwidth manager (BM), depending on loading and collision history. Cable modems use contention slots to request reserved slots in subsequent frames. Contention slots may be assigned contiguously as illustrated in FIG. 15, but are not so restricted. The BM may alternatively split and spread contention slots among any of the basic slots on a per frame basis and communicate the location of those contention slots to the cable modems through a corresponding MAP sent to cable modems in the downstream fast control field (FCF).

The upstream slow control (USC) region 1520 is a configurable region in specified frames within each masterframe. The USC 1520 contains one contention superslot. Being comprised of six basic slots, a superslot is seventy-two bytes long. A superslot allows for the transmission of short messages without first making a reservation request. Some examples of messages appropriate for incorporation within a contention superslot include STM signaling, ranging, control and response messages. The superslot is particularly useful for CM initialization when it initially powers up. Off-hook and other signaling messages for voice and video telephony may also be transmitted in contention mode using superslots. In the event of a collision at a basic slot or a superslot between competing cable modems, a retransmission scheme is incorporated. One embodiment of the present invention includes a retransmission scheme incorporating a binary exponential backoff process. In other embodiments of the present invention, retransmission is accomplished utilizing a ternary tree algorithm or an adaptive p-persistence algorithm.

The reserved region 1540 is available to cable modems in multiples of the basic slot. The MAP of the fast control field (FCF) provides information for which subsets of basic slots in the reserved region are available to which modems. Asynchronous user data PDUs from a CM with reservations for message transmission utilize this reserved region for conveyance of that information. Typically, ATM PDUs and VL PDUs use the reserved region for upstream transmission. Upstream ATM PDUs can be transmitted in six basic slots. The headend BM uses type information to guarantee that all ATM reservations are in blocks of six contiguous slots per frame. Upstream VL PDUs are allocated as many contiguous basic slots as possible.

Figure 16:
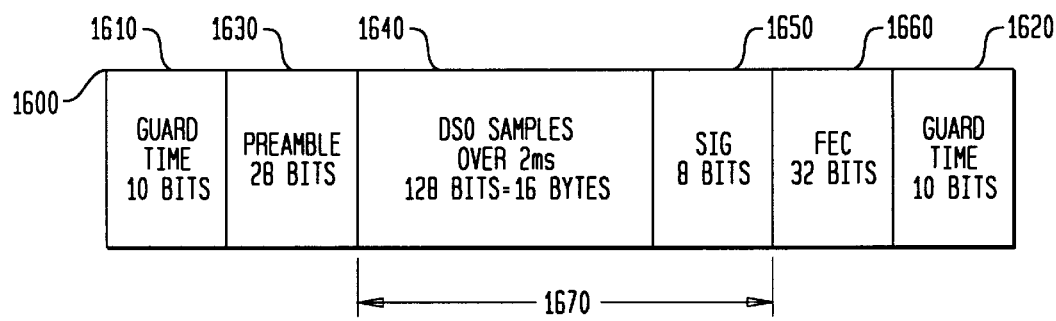
FIG. 16 is an exemplary illustration, in accordance with the present invention, for a structure of an STM upstream burst.

FIG. 16 is an exemplary illustration, in accordance with the present invention, of the structure of an STM upstream burst 1600. A ten bit guard band 1610 is included at the beginning of the burst. A twenty-eight bit preamble 1630 is also included. The STM payload 1640 is sixteen bytes. Less than four kbps bandwidth is required per DS0 connection for signaling. As a result, a one byte signaling field 1650 in the STM PDU is adequate to provide signaling capability for DS0 connections. Payload error is corrected over any two bytes of payload by using four bytes of forward error correction (FEC) 1660. FEC 1660 is provided for two regions 1670, the sixteen byte STM payload 1640 and the one byte signaling field 1650. Sixteen bytes of payload every two milliseconds provides a payload data bit transfer rate of 64,000 bps, however, the STM PDU overhead is eleven bytes long and therefore each STM PDU with payload is a total of twenty-seven bytes. A burst ending 10 bit guard band 1620 is also included in each upstream STM burst 1600.

Figure 17:
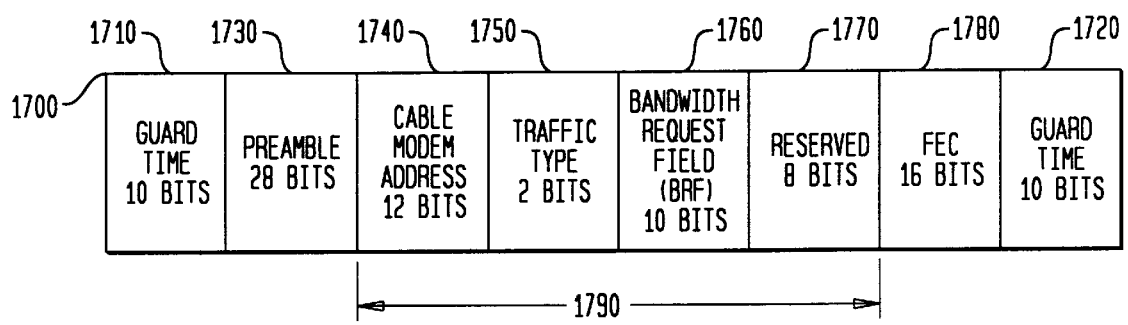
FIG. 17 is a exemplary diagram, in accordance with the present invention, for a structure of an upstream burst for pure contention.

FIG. 17 is a exemplary diagram, in accordance with the present invention, for a structure of an upstream burst for pure contention 1700, also known as a reservation request. Included as elements of a reservation request are a ten bit guard band at the burst front end 1710 and at the burst tail end 1720, and a twenty-eight bit preamble 1730. The reservation request 1700 also contains a twelve bit field identifying the sending cable modem (CM) address 1740 to the headend (HE). A two bit field indicating traffic type 1750 is also included. A bandwidth request field (BRF) 1760 is ten bits in length and sixteen bits are dedicated to FEC 1780. Finally, eight bits are reserved 1770 for future use. Forward error correction is applied over the cable modem address field 1740, the traffic type field 1750, the BRF 1760, and the reserved region 1770, and will correct any one byte within these fields 1790.

The traffic type field (TTF) 1750 specifies the type of PDU which is being transmitted upstream to the HE. A TTF 1750 value of '00' indicates that the PDU is transporting an ATM cell as payload. A TTF 1750 value of '01' indicates that the PDU is transporting a VL payload and that the VL payload is user data. A TTF 1750 value of '10' indicates that the PDU is transporting a VL payload and that the VL payload is an ADAPT control and management message. A TTF 1750 value of '11' is unassigned and reserved.

The bandwidth request field (BRF) 1760 represents a request from a specific cable modem, to the headend BM, for upstream bandwidth allocation in a future upstream frame. For subsequent transmission of upstream ATM PDUs, the BRF 1760 requests the number of upstream ATM cells which are desired to be reserved. An upstream ATM cell reservation consists of six contiguous basic slots. For subsequent transmission of an upstream VL PDU, the BRF 1760 requests the number of upstream basic slots required for transmission. Nine bits of the ten bit BRF 1760 specify the length of a request for bandwidth.

Requests are made absolutely or incrementally. An absolute request specifies the total number of basic slots or ATM cells currently awaiting transmission in a cable modem buffer. An incremental request is a request for additional bandwidth for ATM PDUs that have arrived in the CM buffer since the last request. One bit of the ten bit BRF 1760 denotes whether the request is an absolute or incremental request. The other nine bits specify the quantity of bandwidth requested.

A reservation request, transmitted upstream within a burst for pure contention 1700, is itself a payload. In essence, the BRF 1760 is a ten bit payload, subject to contention, and transmitted upstream with eighty-six bits of overhead. However, a BRF may also be transmitted upstream contained within an ATM or VL PDU. A BRF transmitted in this manner is constructed exactly the same as a BRF transmitted within a burst for pure contention. However, none of the overhead included in a burst for pure contention is included with a BRF accompanying an ATM or VL PDU, since an ATM or VL PDU already include all required information in their overhead. Furthermore, since an ATM or VL PDU are not transmitted in contention basic slots, but rather in reserved basic slots, the BRF included with an ATM or VL PDU is not subject to contention or collision. A BRF transmitted within the frame of an upstream PDU is known as a piggyback request.

Because a BRF 1760 is transmitted upstream from one of a plurality of cable modems to the headend in the contention region, the possibility of a collision is likely. A collision occurs when more than one cable modem attempts to transmit a BRF 1760 in the same basic slot of the same upstream frame. When a collision occurs, neither request is understood by the headend. Therefore, this exemplary embodiment of the present invention also includes a contention resolution mechanism to resolve any collisions. If a collision occurs between competing cable modems while transmitting a BRF 1760, each cable modem must retransmit its request in accordance with the contention resolution mechanism. One example of a contention resolution mechanism known in the art is a binary exponential back-off contention resolution mechanism. The contention resolution mechanism will be explained in greater detail in this application's description of medium access control (MAC) operation.

Figure 18:
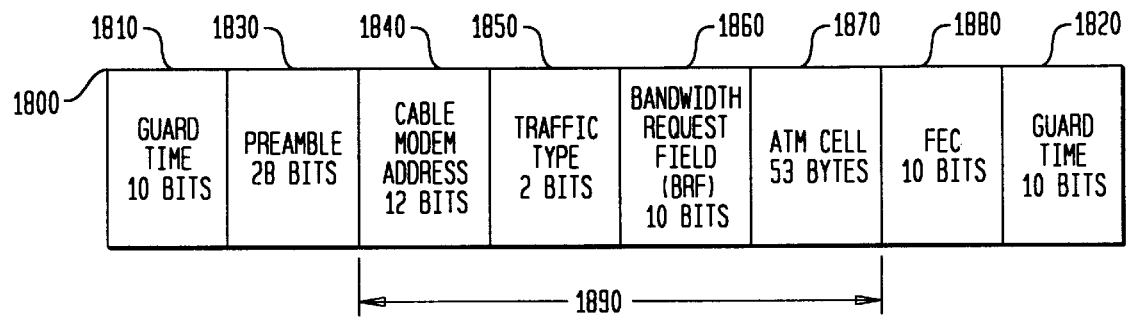
FIG. 18 illustrates an exemplary embodiment of the structure of an upstream burst for an ATM PDU with ATM cell as payload, as incorporated in accordance with the present invention.

FIG. 18 illustrates an exemplary embodiment of the structure of an upstream burst for an ATM PDU with ATM cell as payload 1800, as incorporated in accordance with the present invention. The total PHY layer burst length for an ATM burst is seventy-two bytes, fifty-three bytes for the ATM cell 1870, the remaining nineteen bytes for overhead. The headend BM allocates six contiguous basic slots for each ATM PDU upstream burst.

Included as fields within the ATM PDU are a ten bit guard band at the burst front end 1810 and at the burst tail end 1820, and a twenty-eight bit preamble 1830. In addition to the ATM cell payload 1870, the ATM PDU 1800 also contains a twelve bit field 1840 identifying the address of the transmitting cable modem to the HE. A two bit traffic type field 1850 identifies the burst to the HE as an ATM PDU with an ATM cell payload. Ten bytes are dedicated to FEC 1880, which is applied over four fields 1890; including, the cable modem address field 1840, the TTF field 1850, the BRF 1860, and the ATM cell 1870. FEC 1880 is able to correct any five bytes over the fifty-seven bytes which are forward error corrected.

A BRF 1860 is included within the upstream ATM PDU 1800. In the pure contention mode, a BRF 1860 is the payload. The BRF 1860 included in the ATM PDU 1800 however, is a piggyback request. An ATM PDU piggyback request is a request for allocation of upstream bandwidth in subsequent upstream frames, made from the transmitting CM, and requested for the transmission of ATM cell payloads. A piggyback request requires no additional overhead, since it is included as part of the ATM PDU 1800, which already possesses the requisite information and overhead. Additionally, a piggyback request is incorporated within a PDU for which the HE had already reserved bandwidth, and therefore helps reduce the demand and load in basic slots assigned for contention requests.

Figure 19:
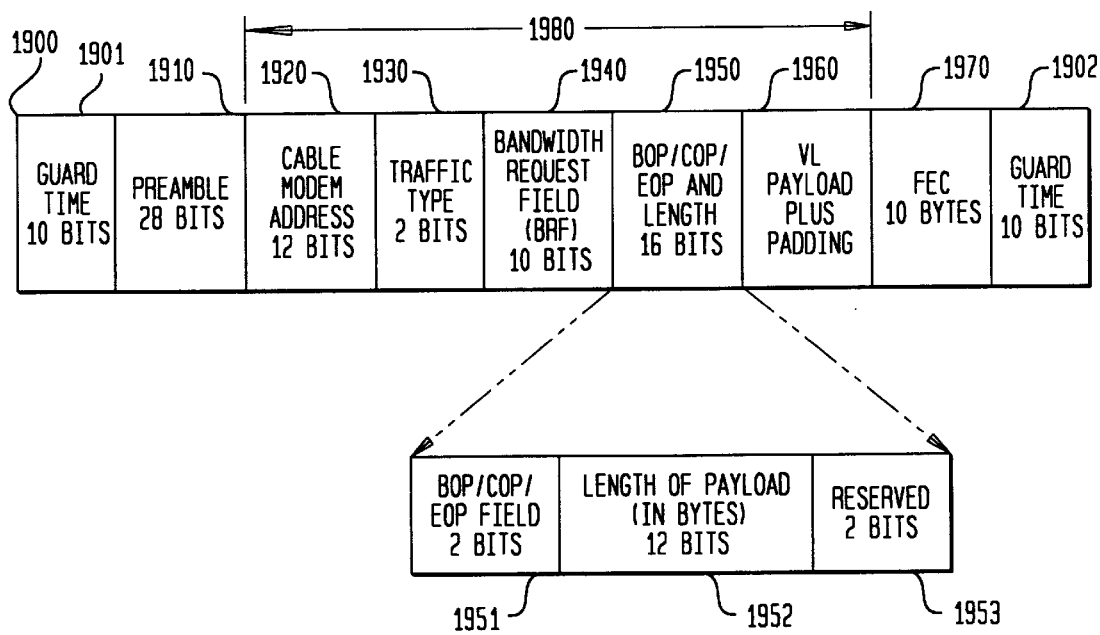
FIG. 19 illustrates an exemplary embodiment of the structure of an upstream burst for a VL PDU with VL payload, as incorporated in accordance with the present invention.

FIG. 19 illustrates an exemplary embodiment of the structure of an upstream burst for a VL PDU with VL payload 1900, as incorporated in accordance with the present invention. Included as elements of the VL PDU are a ten bit guard band at the burst front end 1901 and at the burst tail end 1902, and a twenty-eight bit preamble 1910. In addition do the VL frame payload 1960, the VL PDU 1900 also contains a twelve bit field identifying the sending cable modem (CM) address 1920 to the HE. A two bit traffic type field (TTF) 1930 identifies the burst to the HE as an VL PDU with an VL frame payload. Forward error correction (FEC) is applied over five fields 1980, including: the cable modem address field 1920, the TTF 1930, the BRF 1940, the length field 1950, and the VL payload field 1960. Ten bytes of FEC 1970 can correct any five bytes over the payload.

A ten bit BRF 1940 is included within the upstream VL PDU 1900. In the pure contention mode, a BRF is the payload. The BRF 1940 included in the VL PDU 1900 however, is a piggyback request. An VL PDU piggyback request is a request for allocation of upstream bandwidth in subsequent upstream frames, made from the transmitting CM, and requested for the transmission of VL payloads. A piggyback request requires no additional overhead, since it is included as part of the VL PDU 1900, which already possesses the requisite information and overhead. Additionally, a piggyback request is incorporated within a PDU for which the HE had already reserved bandwidth, thereby decreasing the loading of and demand for basic slots assigned for contention requests.

Also included within the VL PDU is a two byte length field 1950. The length field 1950 contains a two bit BOP/COP/EOP subfield 1951, a twelve bit length subfield 1952, and two bits 1953 reserved for future use. The length subfield 1952 describes the payload length in bytes. Twelve bits can therefore describe a VL frame size up to 4095 bytes. When basic slots have been reserved for upstream VL payloads, the minimum allocation for VL frames within a frame will be two basic slots, or twenty-four bytes. With larger VL frames, the headend BM allocates as many contiguous blocks of basic slots as possible.

Because VL PDUs vary in size and can extend beyond the boundaries of a frame or masterframe, the BOP/COP/EOP subfield 1951 is used to describe to the headend BM whether the attached burst is the beginning, continuation, or end of an VL frame. If the associated VL frame is too long to completely transmit within the allocated bandwidth of one upstream burst, and the payload to be transmitted is the beginning of a new VL frame, then the BOP/COP/EOP subfield 1951 bits are set to '00' to indicate that this payload is the beginning of an VL frame and that the entire VL frame will not be transmitted in this burst. If a portion of an VL frame has already been transmitted in a previous upstream burst and the remainder of the frame is still too long to completely transmit within the allocated bandwidth of the current upstream burst, then the BOP/COP/EOP subfield 1951 bits are set to '01' to indicate that this payload is a continuation of a VL frame and that the entire VL frame will not be transmitted in this burst. If a portion of an VL frame has already been transmitted in previous upstream bursts and the remainder of the VL frame is capable of being transmitted within the allocated bandwidth of the current upstream burst, then the BOP/COP/EOP subfield 1951 bits are set to '10' to indicate that this payload is a continuation of a VL frame and that the entire VL frame will be transmitted in this burst. Finally, if a portion of a VL frame has not been transmitted in a prior upstream burst, and the VL frame is short enough that the entire VL frame is capable of being transmitted within the allocated bandwidth of the current upstream burst, then the BOP/COP/EOP subfield 1951 bits are set to '11' to indicate that a complete VL frame is being transmitted in one upstream VL PDU payload.

For example, suppose a CM is about to transmit a VL frame containing 400 bytes of payload upstream to the HE. Assuming the headend BM can and has allocated up to 204 bytes (17 basic slots) for this communication in each of three successive upstream frames (frames $n_0$, $n_1$, and $n_2$), then the CM transmits 204 bytes of the VL PDU with payload upstream in frame $n_0$. The BOP/COP/EOP field associated with the VL burst in frame $n_0$ is set to '00' to indicate that the beginning, but not a complete VL payload is being transmitted this frame. Since an upstream VL PDU burst contains twenty-one bytes of overhead, only 183 bytes of the VL frame are actually transmitted in frame $n_0$, leaving 217 bytes of the VL frame in the CM buffer to be transmitted in the following upstream frames. In frame $n_1$ the CM transmits the next 204 bytes of the VL PDU with payload upstream in frame $n_1$. The BOP/COP/EOP field associated with the VL burst in frame $n_1$ is set to '01' to indicate that a continuation of the VL frame is being transmitted, but not the remainder of the VL payload. Since an upstream VL PDU burst contains twenty-one bytes of overhead, only the next 183 bytes of the VL frame are actually transmitted in frame nl, leaving thirty-four bytes of the VL frame in the CM buffer to be transmitted in the following upstream frame. Finally, in frame $n_2$, the CM transmits the remaining portion of the VL frame payload. Total required upstream bandwidth is sixty bytes (five basic slots), thirty-four bytes for the remaining VL payload, twenty-one bytes overhead, and five bytes for padding (to round the PDU to an integral multiple of basic slots). The BOP/COP/EOP field associated with frame $n_2$ is set to '10' to indicate the complete remainder of the VL frame is being transmitted in frame $n_2$.

Figure 20:
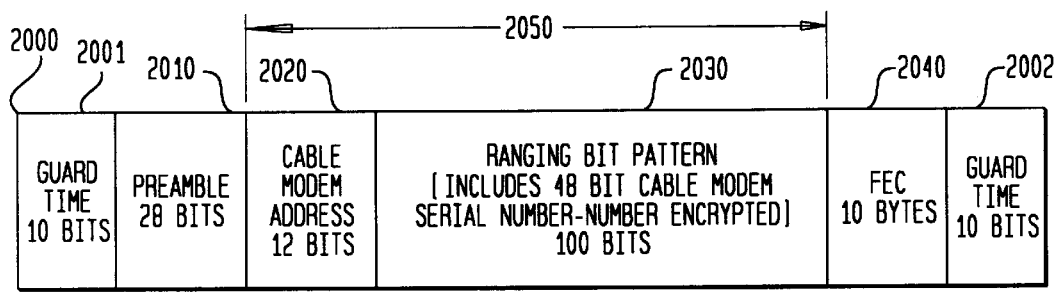
FIG. 20 illustrates an exemplary embodiment of the structure of a ranging upstream burst 2000, an example of a message transmitted within a contention superslot, as incorporated in accordance with the present invention.

FIG. 20 illustrates an exemplary embodiment of the structure of a ranging upstream burst 2000, an example of a message transmitted within a contention superslot, as incorporated in accordance with the present invention. A contention superslot is created by the bandwidth manager (BM) for the purpose of transmitting upstream slow control (USC) messages. Upstream control, management, and signaling messages are referred to as USC messages, and are nominally transmitted in a contention superslot. Some illustrative examples of USC messages are 'power on' or 'off-hook' indication by a CM, ranging messages, etc. A USC message is comprised of a front end and a tail end guard band, a preamble, a cable modem address, and the control message.

A contention superslot is formed by combining six contiguous basic slots. The frequency and location of a superslot within an upstream frame is determined by the headend BM. The headend BM informs the cable modems that a USC superslot will be available in the next upstream frame by transmitting a reservation message in the downstream MAP field. The reservation message is assigned the cable modem address of '1111 1111 1110'. When a CM identifies this address, it interprets that it indicates a USC superslot will be available and can be accessed via the contention mode by any CM having a control or signaling message to transmit.

The USC superslot is accessed by cable modems in a contention mode only. Therefore, collisions of USC superslot PDUs are likely. The threat of a collision is not of a great concern however, since control and signaling messages are infrequent and sporadic in nature. Additionally, utilization of the contention mode limits access delays for control and signaling messages for two reasons. First, successful transmission in the contention region on a first transmission attempt provides immediate message delivery without the necessity of a reservation request. Second, the total demand for a USC channel with which to transmit upstream a control or signaling message is typically very low, approximately five to ten percent of the USC channel bandwidth.

The USC message illustrated in FIG. 20 is that of an upstream ranging burst 2000, a type of message transmitted within a USC superslot. A USC PDU contains a ten bit front end guard time field 2001, a ten bit tail end guard time field 2002, a twenty-eight bit preamble, a twelve bit cable modem address 2020, a control or signaling message, and thirty-two bits of FEC 2040. FEC over two regions 2050; the cable modem address 2020 and the USC message 2030 result in payload error correction of any two bytes. The ranging bit pattern for this upstream ranging burst 2000 is the USC message payload. The payload for a ranging burst is 100 bits in length, including an encrypted forty-eight bit cable modem serial number, generating a total ranging burst PDU length of 192 bits (24 bytes or 2 basic slots). In general, a USC PDU extends over all six basic slots allocated. A ranging burst is an exception to this general rule and can be transmitted anywhere within the span of a contention superslot.

CONTENTION TRANSMISSION AND COLLISION RESOLUTION

Figure 21:
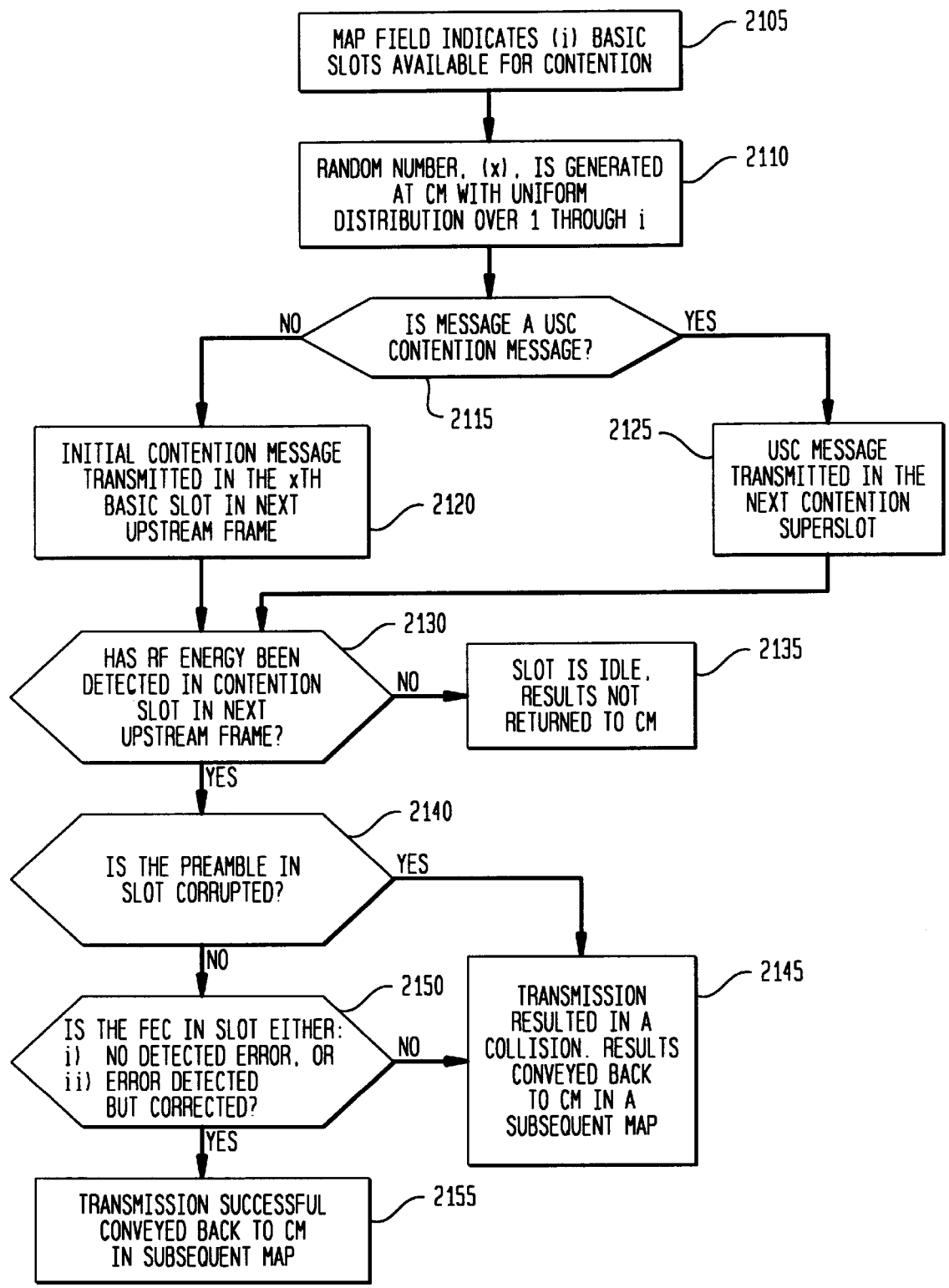
FIG. 21 is a flow diagram illustrating an exemplary contention transmission and collision detection process, in accordance with the present invention.

FIG. 21 is a flow diagram illustrating an exemplary upstream collision resolution process, in accordance with the present invention. Recall that the MAP field transmitted by the HE conveys to the cable modems which upstream basic slots are available for contention transmission in the next frame. When more than one CM attempts to transmit upstream within the same basic slot, or within the same USC superslot, a collision occurs. A collision results in the corruption of data from both cable modems, and both must retransmit in order to send their original messages to the headend. Therefore, the HE utilizes a collision detection algorithm to detect when a collision has occurred and to transmit to the individual cable modems whether or not their contention burst was successful.

In step 2105, the MAP field indicates that there are i basic slots available for contention in the next frame. The cable modem generates a random integer, x, in accordance with step 2110. The value of x is uniformly distributed over the values one through i. The question is then asked, in step 2115, whether or not the message to be transmitted is a upstream slow control (USC) contention message. If the message to be transmitted upstream is not a USC message, then the contention message is transmitted in the xth basic slot of the asynchronous contention region in the next upstream frame, as per step 2120. If the message to be transmitted upstream is a USC message, then it is transmitted upstream in the next contention superslot, as directed by step 2125. The headend (HE) monitors for RF energy in each contention basic slot and superslot. If RF energy is not detected in step 2130, then the slot is idle. Idle slot results are not returned to the cable modems, as indicated in step 2135. If RF energy is detected, then step 2140 instructs to check whether the preamble is corrupted. If the preamble is corrupted, a collision is indicated and step 2145 directs that the HE report back to the cable modem that a collision has occurred. The collision is reported in the MAP field, which is conveyed as part of the fast control field (FCF). If the result of step 2140 is negative and the preamble is not corrupted, however, then step 2150 examines the forward error correction (FEC) for that slot and if no error is detected, or if an error is detected but corrected, the transmission is successful. Step 2155 conveys to the sending cable modem, via the MAP, field that the transmission of the contention message was successful. If the answer to step 2150 is negative, then a transmission collision is indicated and step 2145 directs that the HE report back to the cable modem that a collision has occurred. The collision is reported in the MAP field.

Figure 22:
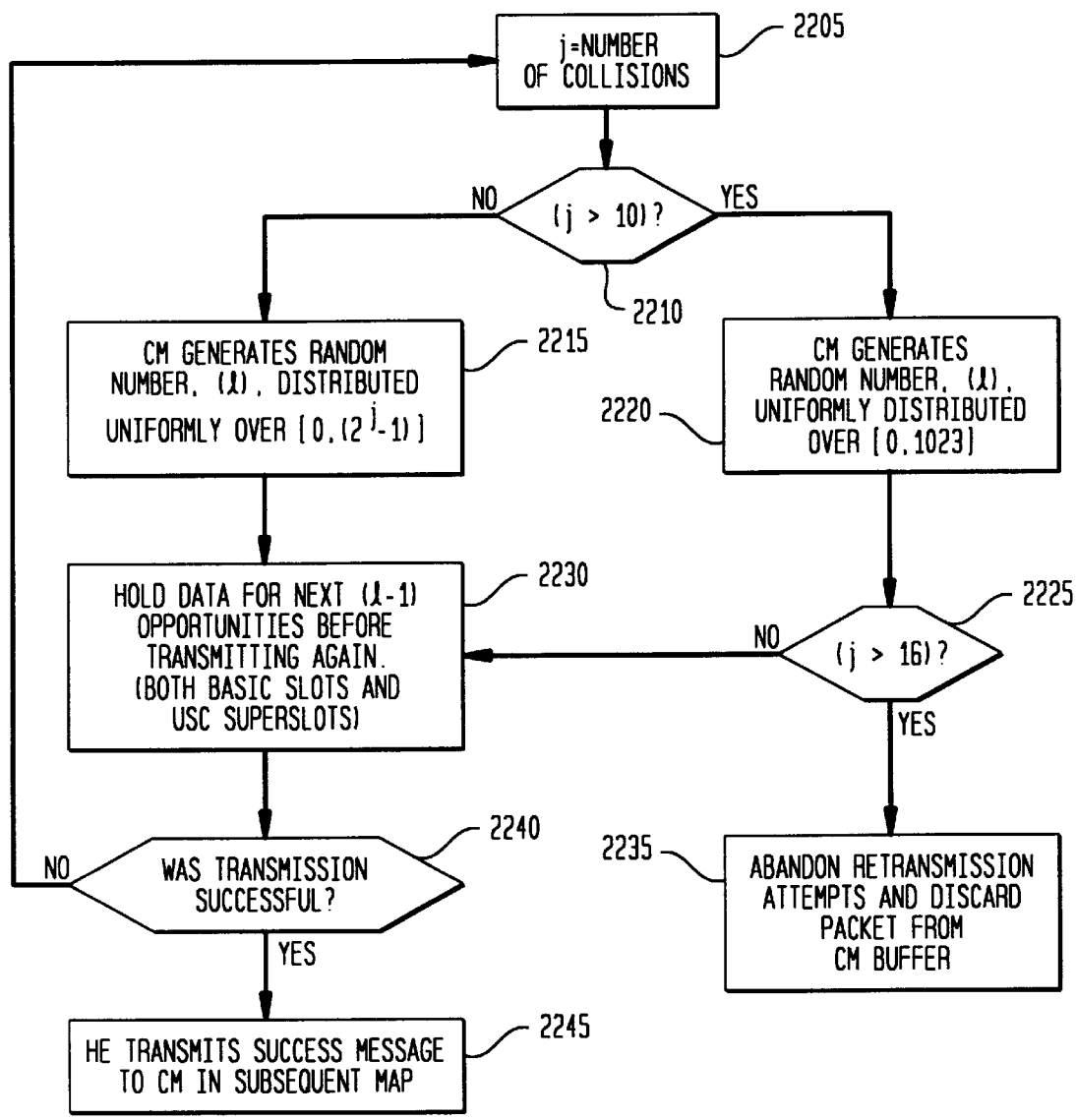
FIG. 22 is a flow diagram illustrating an exemplary retransmission process, for use when upstream contention messages result in a collision, and utilizing a binaryexponential backoff algorithm.

FIG. 22 is a flow diagram illustrating an exemplary retransmission process, for use when upstream contention messages result in a collision, and utilizing a binary-exponential backoff algorithm. When an upstream contention message results in a collision, the cable modems that were affected by the collision retransmit their message. The present invention utilizes a binary exponential backoff algorithm to control the retransmission of contention messages. In step 2205, the cable modem attempting to retransmit an upstream contention message first sets the variable j equal to the number of collisions the message has currently encountered. If, in accordance with step 2210, less than ten collisions have been encountered, then step 2215 directs the CM to generate a random number, l, uniformly distributed over the range from zero through ($2^j-1$). If greater than ten collisions have been encountered during the retransmission of one message, then step 2220 directs the CM to generate a random number, l, uniformly distributed over the range from zero to 1023. Step 2225 checks if the number of collisions, j, is greater than sixteen. If greater than sixteen collisions have occurred, then step 2235 directs that retransmission attempts for the upstream contention message should be abandoned and that the message should be discarded from CM buffer memory. However, if the result of step 2225 is negative, then step 2230 is performed. Step 2230 is also performed as a natural consequence of completing step 2215. Step 2230 directs that the upstream contention message should be held for the next (l–1) opportunities of the same kind (either a basic slot or a USC superslot) before transmitting it again. The previously collided message is then retransmitted in the next contention slot opportunity. If transmission was successful, then, in accordance with step 2245, the HE transmits a success message to the transmitting CM in a subsequent MAP. If, however, the answer to step 2240 is negative, then the retransmission process starts again at step 2205.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claims are reserved.

What is claimed is:

1. A method for transmission of synchronous transfer mode (STM) payloads, asynchronous transfer mode (ATM) payloads, and asynchronous variable length (VL) payloads over a bi-directional broadband communications network having a source and a destination, said method comprising the steps of:

dividing said transmission into a series of successive time subframes;

partitioning each of said time subframes into at least a first region, a second region, and a third region;

demarcating a first boundary between said first region and said second region;

demarcating a second boundary between said second region and said third region;

allocating at least one time slot within said first region for transmission of said STM payloads whenever said STM payloads are queued at said source for transmission to said destination;

designating said second region for transmission of said ATM payloads, wherein an individual ATM cell of said ATM payload is allowed to cross successive second region boundaries; and designating said third region for transmission of said asynchronous VL payloads;

wherein an individual VL data unit of said VL payload is allowed to cross successive third region boundaries.

2. The method in accordance with claim 1 wherein:
    said source is a headend; and
    said destination is a cable modem.

3. The method in accordance with claim 1 wherein:
    said source is a cellular base station; and
    said destination is a mobile station.

4. The method in accordance with claim 1 further comprising the step of serially appending an integral number of said successive time subframes to form a time frame;
    said integral number of said successive time subframes being contiguous; and
    said appending step being iterative to produce a series of successive and contiguous time frames.

5. The method in accordance with claim 4 further comprising the step of serially appending an integral number of said successive and contiguous time frames to form a time masterframe.

6. The method in accordance with claim 4 further comprising the step of additionally partitioning said time subframes to include a fourth region;
    said fourth region comprised of framing bits;
    said framing bits utilized for synchronization of said destination to said source; and
    said framing bits further used to uniquely identify each of said time subframes within a time frame.

7. The method in accordance with claim 4 further comprising the steps of:
    dynamically repositioning said first boundary position within each of said time subframes belonging to a particular time frame, thereby resizing said first region in each of said time subframes belonging to said particular time frame; and
    dynamically repositioning said second boundary position within each of said time subframes belonging to said particular time frame, thereby resizing said second region and said third region in each of said time subframes belonging to said particular time frame.

8. The method in accordance with claim 1 further comprising the steps of:
    additionally partitioning said time subframes to include a fifth region, said fifth region being a pointer field (PF);
    transmitting a VL protocol data unit (PDU) within said third region, said VL PDU incompletely transmitted in said third region of a first time subframe, a remainder of said VL PDU completely transmitted within said third region of a subsequent time subframe; and
    assigning a length value to said PF of said first time subframe, said length value representing a beginning location for said remainder of said VL PDU within said third region of said subsequent time subframe.

9. The method in accordance with claim 1 further comprising the step of additionally partitioning said time subframes to include a sixth region; said sixth region being a fast control field (FCF); said FCF utilized to convey delay sensitive control information between said source and said destination.

10. A method for downstream transmission over a bi-directional hybrid fiber/coax network of synchronous transfer mode (STM) payloads, asynchronous transfer mode (ATM) payloads, and asynchronous variable length (VL) payloads, said hybrid fiber/coax network including a head-end (HE), a HE bandwidth manager (BM) and a plurality of cable modems, said HE operable for downstream transmission to said cable modems, each of said cable modems operable for upstream transmission to said HE, said method comprising the steps of:

dividing said downstream transmission into a series of successive downstream subframes;

partitioning each of said downstream subframes into at least a first downstream region, a second downstream region, and a third downstream region;

demarcating a first downstream boundary between said first downstream region and said second downstream region;

demarcating a second downstream boundary between said second downstream region and said third downstream region;

allocating at least one downstream time slot within said first downstream region for downstream transmission of said STM payloads whenever at least one of said STM payloads are queued at said HE for downstream transmission to said cable modems;

designating said second downstream region for downstream transmission of said ATM payloads wherein an individual ATM cell of said ATM payload is allowed to cross second region subframe boundaries; and designating said third downstream region for downstream transmission of said asynchronous VL payloads, wherein an individual VL data unit of said VL payload is allowed to cross successive third region boundaries.

11. The method in accordance with claim 10 further comprising the step of serially grouping an integral number of said successive downstream subframes to form a downstream frame;

said integral number of said successive downstream subframes being contiguous; and said grouping step being iterative, thereby producing a series of successive and contiguous downstream frames.

12. The method in accordance with claim 11 further comprising the step of serially grouping an integral number of said successive and contiguous downstream frames to form a downstream masterframe.

13. The method in accordance with claim 12, said method additionally operable for upstream transmission over said bi-directional hybrid fiber/coax network of said STM payloads, said ATM payloads, and said asynchronous VL payloads, said method further comprising the steps of:

dividing said upstream transmission into a series of successive upstream frames; and grouping an integral number of said successive upstream frames to form an upstream masterframe.

14. The method in accordance with claim 13 wherein:

said upstream masterframe time length is equal to said downstream masterframe time length; and said upstream frame time length is equal to said downstream frame time length.

15. The method in accordance with claim 11 further comprising the steps of:

repositioning said first downstream boundary position within each of said downstream subframes associated with a particular downstream frame, thereby resizing said first downstream region within each of said downstream subframes associated with said particular downstream frame; and repositioning said second downstream boundary position within each of said downstream subframes associated with said particular downstream frame, thereby resizing said second downstream region and said third downstream region within each of said downstream subframes associated with said particular downstream frame.

16. The method in accordance with claim 11, said method additionally operable for upstream transmission over said bidirectional hybrid fiber/coax network of said STM payloads, said ATM payloads, and said asynchronous VL payloads, said method further comprising the steps of:

dividing said upstream transmission into a series of successive upstream frames;

partitioning each of said upstream frames into a first upstream region and a second upstream region;

allocating at least one upstream time slot within said first upstream region for upstream transmission of said STM payloads from one of said cable modems, whenever at least one of said STM payloads are queued at one of said cable modems for upstream transmission to said HE; and dividing said second upstream region into a plurality of upstream basic slots, said plurality of upstream basic slots allocated and assigned for said upstream transmission of said ATM payloads and said asynchronous VL payloads.

17. The method in accordance with claim 16 further comprising the step of additionally partitioning said downstream subframes to include a fourth downstream region;

said fourth downstream region comprised of framing bits;

said framing bits utilized by said cable modems for synchronization of said upstream frames to said downstream frames; and said synchronization enabled by said cable modems recognizing a repetitive bit pattern transmitted by said headend within each of said downstream frames.

18. The method in accordance with claim 17 wherein said framing bits are further utilized by said cable modems for synchronization of said upstream masterframe to said downstream masterframe; said synchronization enabled by said downstream frames of a first downstream masterframe containing an identifying bit.

19. The method in accordance with claim 17 wherein said framing bits are further utilized to enable said cable modems to uniquely identify each of said downstream subframes within a downstream frame; said subframe identification enabled through assigning a unique bit arrangement to each of said downstream subframes within each of said downstream frames.

20. The method in accordance with claim 16 further comprising the steps of:

dynamically changing said first downstream boundary position within each of said downstream subframes belonging to a particular downstream frame, thereby resizing said first downstream region in each of said downstream subframes within said particular downstream frame; and dynamically changing said second downstream boundary position within each of said downstream subframes belonging to said particular downstream frame, thereby resizing said second downstream region and said third downstream region in each of said downstream subframes within said particular time frame.

21. The method in accordance with claim 16 further comprising the steps of:

additionally partitioning said downstream subframes to include a fifth downstream region, said fifth downstream region being a pointer field (PF);

transmitting a VL protocol data unit (PDU) within said fifth downstream region, said VL PDU incompletely transmitted in said third downstream region of a first downstream subframe, a remainder of said VL PDU completely transmitted in a subsequent downstream subframe; and assigning a length value to said PF of said first downstream subframe, said length value representing a beginning location for said remainder of said VL PDU within said third region of said subsequent downstream subframe.

22. The method in accordance with claim 16 further comprising the steps of:

transmitting downstream, within said second downstream region, said ATM payloads, said ATM payloads comprised of an ATM cell with an ATM cell header;

accessing a virtual path identifier (VPI) included in said ATM cell header; and utilizing said VPI as a surrogate cable modem address, said surrogate cable modem address representing a desired destination for said downstream transmission.

23. The method in accordance with claim 16 further comprising the steps of:

transmitting downstream, within said second downstream region, said ATM payloads, each of said ATM payloads comprised of an ATM cell with an ATM cell header, said ATM cell header containing a header error control (HEC) field;

detecting transmission errors in said ATM cell header at said cable modems utilizing said HEC field; and synchronizing cable modems to an ATM boundary for said ATM payload via utilization of said HEC field.

24. The method in accordance with claim 16 further comprising the steps of:

transmitting downstream a VL protocol data unit (PDU) within said third downstream region, said VL PDU comprised of a VL PDU header and a VL payload;

including a header error control (HEC) field within said VL PDU header;

detecting transmission errors in said VL PDU header at said cable modems utilizing said HEC field; and synchronizing cable modems to a boundary for said VL payload via utilization of said HEC field.

25. The method in accordance with claim 16 further comprising the steps of:

transmitting downstream a VL protocol data unit (PDU) within said third downstream region, said VL PDU comprised of a VL PDU header and a VL payload;

including a length field within said VL PDU header; and conveying VL payload length to said cable modems via said length field, said length field further enabling said cable modems to synchronize with a boundary for said VL PDU.

26. The method in accordance with claim 16 further comprising the step of additionally partitioning said downstream subframes to include a sixth downstream region; said sixth downstream region being a fast control field (FCF); said FCF utilized to convey delay sensitive control information from said headend (HE) bandwidth manager (BM) to said cable modems.

27. The method in accordance with claim 26 wherein said fast control field (FCF) conveys a position location for said first downstream boundary to said cable modems;

said first downstream boundary separating said first downstream region from said second downstream region;

said first downstream region utilized for downstream transmission of said STM payloads; and said second downstream region utilized for downstream transmission of said ATM payloads.

28. The method in accordance with claim 26 wherein said fast control field (FCF) conveys a position location for said second downstream boundary to said cable modems;

said second downstream boundary separating said second downstream region from said third downstream region;

said second downstream region utilized for downstream transmission of said ATM payloads; and said third downstream region utilized for downstream transmission of said asynchronous VL payloads.

29. The method in accordance with claim 26 wherein said fast control field (FCF) conveys to said cable modems a position location for separation of said first upstream region and said second upstream region;

said first upstream region utilized for transmission of said STM payloads; and said second upstream region utilized for upstream transmission of said ATM payloads and said asynchronous VL payloads.

30. The method in accordance with claim 26 further comprising the steps of:

subdividing said second upstream region into at least a first upstream subregion and a second upstream subregion, said first upstream subregion assigned as a contention region, said second upstream subregion assigned as a reserved region;

assigning a portion of said plurality of upstream basic slots as at least one contention slot within said contention region;

assigning a portion of said plurality of upstream basic slots to said reserved region, said reserved region operable for upstream transmission of said ATM payloads and said asynchronous VL payloads;

transmitting upstream requests from said cable modems, said requests made for reserving upstream basic slots within said reserved region in a subsequent upstream frame, said requests made via said contention slots, said contention slots subject to a collision with said requests from at least a second cable modem;

retransmitting upstream requests from said cable modems if said request initially resulted in a collision; and assigning a portion of said plurality of upstream basic slots within said reserved region.

31. The method in accordance with claim 30 further comprising the steps of:

transmitting a first FCF bit value if a previous upstream transmission within said contention region resulted in a collision; and transmitting a second FCF bit value if said previous upstream transmission within said contention region was successful.

32. The method in accordance with claim 30 further comprising the step of conveying to said cable modems, via said FCF, a status for each of said plurality of upstream basic slots in a subsequent frame; said status having a first status value if assigned within said reserved region, said status having a second status value if assigned within said contention region.

33. The method in accordance with claim 30 further comprising the steps of:

cable modems subdividing said second upstream region into a third upstream subregion, said third upstream subregion assigned as an upstream slow control (USC) region;

allocating within said USC region an integral number of upstream basic slots to form a superslot; and transmitting upstream control and signaling messages within said superslot; said superslot subject to contention and collision.

34. The method in accordance with claim 33 wherein one of said control and signaling messages is a ranging message, said ranging message transmitted upstream within said superslot in said USC region, said ranging message utilized to compensate for propagation delay differences between a group of cable modems and said headend within said network.

35. The method in accordance with claim 26 further comprising the steps of:
dividing said FCF into a plurality of MAPs; and
inserting one of each of said plurality of MAPs into a separate downstream subframe.

36. A method for bi-directional transmission over a cellular wireless system of synchronous transfer mode (STM) payloads, asynchronous transfer mode (ATM) payloads, and asynchronous variable length (VL) payloads, said cellular wireless system including a common controller at a cellular base station and a plurality of mobile stations, said method comprising the steps of:
dividing said downstream transmission into a series of successive downstream subframes;
partitioning each of said downstream subframes into at least a first downstream region, a second downstream region, and a third downstream region;
demarcating a first downstream boundary between said first downstream region and said second downstream region;
demarcating a second downstream boundary between said second downstream region and said third downstream region;
allocating at least one downstream time slot within said first downstream region for downstream transmission of said STM payloads whenever at least one of said STM payloads are queued at said common controller for downstream transmission to each of said plurality of mobile stations;
designating said second downstream region for downstream transmission of said ATM payloads, wherein an individual ATM cell of said ATM payload is allowed to cross successive second region boundaries; and
designating said third downstream region for downstream transmission of said asynchronous VL payloads, wherein an individual VL data unit of said VL payload is allowed to cross successive third region boundaries.

37. The method in accordance with claim 36 further comprising the step of serially grouping an integral number of said successive downstream subframes to form a downstream frame;
said integral number of said successive downstream subframes being contiguous; and
said grouping step being iterative, thereby producing a series of successive and contiguous downstream frames.

38. The method in accordance with claim 37 further comprising the step of serially grouping an integral number of said successive and contiguous downstream frames to form a downstream masterframe.

39. The method in accordance with claim 38, said method additionally operable for upstream transmission over said cellular wireless system of said STM payloads, said ATM payloads, and said asynchronous VL payloads, said method further comprising the steps of:

dividing said upstream transmission into a series of successive upstream frames; and
grouping an integral number of said successive upstream frames to form an upstream masterframe.

40. The method in accordance with claim 39 wherein:
said upstream masterframe length is equal to said downstream masterframe length; and
said upstream frame length is equal to said downstream frame length.

41. The method in accordance with claim 37 further comprising the steps of:
dynamically repositioning said first downstream boundary position within each of said downstream subframes associated with a particular downstream frame, thereby resizing said first downstream region within each of said downstream subframes associated with said particular downstream frame; and
dynamically repositioning said second downstream boundary position within each of said downstream subframes associated with said particular downstream frame, thereby resizing said second downstream region and said third downstream region within each of said downstream subframes associated with said particular downstream frame.

42. The method in accordance with claim 37, said method additionally operable for upstream transmission over said bi-directional cellular wireless system of said STM payloads, said ATM payloads, and said asynchronous VL payloads, said method further comprising the steps of:
dividing said upstream transmission into a series of successive upstream frames;
partitioning each of said upstream frames into a first upstream region and a second upstream region;
allocating at least one upstream time slot within said first upstream region for upstream transmission of said STM payloads from at least one of said plurality of mobile stations, whenever at least one of said STM payloads are queued with at least one of said plurality of mobile stations for upstream transmission to said common controller; and
dividing said second upstream region into a plurality of upstream basic slots, said plurality of upstream basic slots allocated and assigned for said upstream transmission of said ATM payloads and said asynchronous VL payloads.

43. The method in accordance with claim 42 further comprising the steps of:
subdividing said second upstream region into at least a first upstream subregion and a second upstream subregion, said first upstream subregion assigned as a contention region, said second upstream subregion assigned as a reserved region;
assigning a portion of said plurality of upstream basic slots as at least one contention slot within said contention region;
assigning a portion of said plurality of upstream basic slots to said reserved region, said reserved region operable for upstream transmission of said ATM payloads and said asynchronous VL payloads;
transmitting upstream requests from at least one of said plurality of mobile stations, said requests made for reserving said upstream basic slots within said reserved region in a subsequent upstream frame, said requests made via said contention slots, said contention slots subject to a collision with said requests from at least a second of said plurality of mobile stations;

retransmitting upstream requests from said at least one of said plurality of mobile stations if said request initially resulted in a collision; and assigning a portion of said plurality of upstream basic slots within said reserved region.

44. A multiservice protocol for bi-directional broadband communications system operating between a source and at least one destination, said protocol having a downstream structure and an upstream structure, said downstream structure comprising:

a series of successive downstream frames included within said downstream structure;

a plurality of downstream subframes, said downstream frames comprised of an integral number of said downstream subframes;

a downstream synchronous region included within said downstream subframes when synchronous transfer mode (STM) payloads are to be transmitted;

at least one downstream STM time slot within said downstream synchronous region when STM payloads are to be transmitted;

a first downstream asynchronous region (ATR1) included within said downstream subframes; said ATR1 utilized for conveyance of asynchronous transfer mode (ATM) payloads, wherein an individual ATM cell of said ATM payload is allowed to cross successive second region boundaries; and a second downstream asynchronous region (ATR2) included within said down subframes; said ATR2 utilized for conveyance of asynchronous variable length (VL) payloads, wherein an individual VL data unit of said VL payload is allowed to cross successive third boundaries.

* * * * *